US012700788B2

(12) United States Patent
Matsumoto

(10) Patent No.: US 12,700,788 B2
(45) Date of Patent: Aug. 4, 2026

(54) INTEGRATED CIRCUIT AND POWER SUPPLY CIRCUIT

(71) Applicant: FUJI ELECTRIC CO., LTD., Kawasaki (JP)

(72) Inventor: Shinji Matsumoto, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 256 days.

(21) Appl. No.: 18/676,182

(22) Filed: May 28, 2024

(65) Prior Publication Data

US 2024/0429806 A1 Dec. 26, 2024

(30) Foreign Application Priority Data

Jun. 22, 2023 (JP) ................................. 2023-102829
Feb. 1, 2024 (JP) ................................. 2024-014045

(51) Int. Cl.
H02M 1/00 (2006.01)
H02M 3/335 (2006.01)

(52) U.S. Cl.
CPC ....... H02M 1/0006 (2021.05); H02M 1/0032 (2021.05); H02M 3/33523 (2013.01)

(58) Field of Classification Search
CPC .... H02M 1/0006; H02M 1/0032; H02M 1/08; H02M 1/32; H02M 7/217; H02M 3/33523; H02M 3/33507; H02M 3/33571
See application file for complete search history.

(56) References Cited

U.S. PATENT DOCUMENTS

| | | | |
|---|---|---|---|
| 10,034,336 B1 * | 7/2018 | Ye | H02M 3/33523 |
| 2012/0229045 A1 | 9/2012 | Kikuchi et al. | |
| 2017/0005585 A1 * | 1/2017 | Shimura | H02M 3/33571 |
| 2018/0316269 A1 * | 11/2018 | Shimura | H02M 3/33571 |
| 2018/0351357 A1 * | 12/2018 | Feldtkeller | H02M 7/217 |
| 2022/0038009 A1 | 2/2022 | Maruyama et al. | |
| 2023/0253872 A1 * | 8/2023 | Tanaka | H02M 3/33571 |
| | | | 363/21.02 |

FOREIGN PATENT DOCUMENTS

| | | |
|---|---|---|
| JP | 2012-190559 A | 10/2012 |
| JP | 2022-025944 A | 2/2022 |

* cited by examiner

*Primary Examiner* — Monica Lewis
*Assistant Examiner* — Jye-June Lee
(74) *Attorney, Agent, or Firm* — Rabin & Berdo, P.C.

(57) ABSTRACT

An integrated circuit for a power supply circuit that includes a transformer, a transistor and a capacitor. The power supply circuit generates an output voltage from an AC voltage. The integrated circuit drives the transistor, and includes: a terminal connected to the capacitor and receiving a power supply voltage; a mode detection circuit detecting whether an operation mode of the power supply circuit is a first mode or a second mode; a discharge circuit discharging the capacitor and lowering the power supply voltage to a first level, when the operation mode is the first mode; and a drive signal output circuit outputting, to the transistor, a drive signal that is at a level of the power supply voltage, and at a predetermined level lower than the level of the power supply voltage, when the operation mode is detected to be the first mode and the second mode, respectively.

10 Claims, 17 Drawing Sheets

| SIGNAL | Sdrv="H" AND en="H" (Sup,Sdown TARGET) | | | | Sdrv="H" AND en="L" | | Sdrv="L" |
|---|---|---|---|---|---|---|---|
| | STATE 1 \| GATE Vx \| L | STATE 2 \| GATE Vx \| M | STATE 3 \| GATE Vx \| S | NON-DRIVE STATE | STATE 4 \| GATE Vx \| L | STATE 5 \| GATE Vx \| S | |
| D0 | H | L | L | L | H | L | L |
| D1 | H | H | L | L | H | L | L |
| D2 | H | H | H | L | H | H | L |
| D3 | L | L | L | L | L | L | H |

FIG. 5

INTEGRATED CIRCUIT AND POWER SUPPLY CIRCUIT

CROSS-REFERENCE TO RELATED APPLICATIONS

The present application claims priority pursuant to 35 U.S.C. § 119 from Japanese patent application numbers 2023-102829 and 2024-014045, filed Jun. 22, 2023, and Feb. 1, 2024, respectively, of which full contents are incorporated herein by reference.

BACKGROUND

Technical Field

The present disclosure relates to an integrated circuit and a power supply circuit.

Description of the Related Art

Some power supply circuits include an integrated circuit that drives a transistor to control a current flowing through a primary coil of a transformer that includes the primary coil, a secondary coil, and an auxiliary coil, and are capable of changing an output voltage on the secondary side from the outside (for example, Japanese Patent Application Publication No. 2012-190559).

In a power supply circuit, a coil voltage from an auxiliary coil is used to generate a power supply voltage of an integrated circuit. When the integrated circuit drives a transistor with a drive voltage of the power supply voltage, the drive voltage may exceed the withstand voltage of the transistor, which may cause breakdown of the transistor.

Thus, some integrated circuits include a driver circuit that drives a transistor with a drive voltage lower than a power supply voltage, when the power supply voltage is high.

Meanwhile, when the power supply voltage is low, there is no need to drive the transistor by the drive voltage lower than the power supply voltage. Accordingly, in order to reduce the power consumption of the integrated circuit, the operation of the driver circuit may be changed such that the transistor is driven by the power supply voltage, when an output voltage is low.

However, although a change to lower the output voltage is performed, if the operation of the driver circuit is changed when the power supply voltage has not sufficiently dropped, the integrated circuit may drive the transistor by the drive voltage exceeding the withstand voltage of the transistor, which may cause breakdown of the transistor.

SUMMARY

An aspect of the present disclosure is an integrated circuit for a power supply circuit that includes a transformer including a primary coil, a secondary coil, and an auxiliary coil, a transistor configured to control a current flowing through the primary coil, and a first capacitor configured to receive a power supply voltage corresponding to a coil voltage at the auxiliary coil, the power supply circuit being configured to operate in an operation mode to generate an output voltage from an alternating current (AC) voltage, the operation mode being either a first mode, in which the generated output voltage is at a first target level, or a second mode, in which the generated output voltage is at a second target level higher than the first target level, the integrated circuit being configured to drive the transistor, the integrated circuit comprising: a first terminal connected to the first capacitor, the first terminal being configured to receive the power supply voltage corresponding to a coil voltage at the auxiliary coil; a mode detection circuit configured to detect whether the operation mode of the power supply circuit is the first mode or the second mode; a discharge circuit configured to discharge the first capacitor and lower a level of the power supply voltage to a first level, when it is detected that the operation mode is the first mode; and a drive signal output circuit configured to output a drive signal to the transistor, the drive signal being at a level of the power supply voltage, when the operation mode is detected to be the first mode, and at a predetermined level lower than the level of the power supply voltage, when the operation mode is detected to be the second mode.

Another aspect of the present disclosure is a power supply circuit configured to operate in an operation mode to generate an output voltage from an alternating current (AC) voltage, the operation mode being either a first mode, in which the generated output voltage is at a first target level, or a second mode, in which the generated output voltage is at a second target level higher than the first target level, the power supply circuit comprising: a transformer including a primary coil, a secondary coil, and an auxiliary coil; a transistor configured to control a current flowing through the primary coil; a first capacitor configured to receive a power supply voltage corresponding to a coil voltage at the auxiliary coil; and an integrated circuit configured to drive the transistor, the integrated circuit including a first terminal connected to the first capacitor, the first terminal being configured to receive the power supply voltage corresponding to a coil voltage at the auxiliary coil, a mode detection circuit configured to detect whether the operation mode of the power supply circuit is the first mode or the second mode, a discharge circuit configured to discharge the first capacitor and lower a level of the power supply voltage to a first level, upon detecting that the operation mode is the first mode, and a drive signal output circuit configured to output a drive signal to the transistor, the drive signal being at the level of the power supply voltage, when the operation mode is detected to be the first mode, and at a predetermined level lower than the level of the power supply voltage, when the operation mode is detected to be the second mode.

BRIEF DESCRIPTION OF THE DRAWINGS

FIG. 2 is a diagram illustrating a configuration example of a control IC 42a.

FIG. 5 is a diagram illustrating the logic levels of the control signals D0 to D3 outputted by an adjustment circuit 211 in each state.

FIG. 9 is a diagram illustrating an example of an operation of a control IC 42a.

FIG. 10 is a diagram illustrating an example of an operation of a control IC 42a.

DETAILED DESCRIPTION

Figure 1:
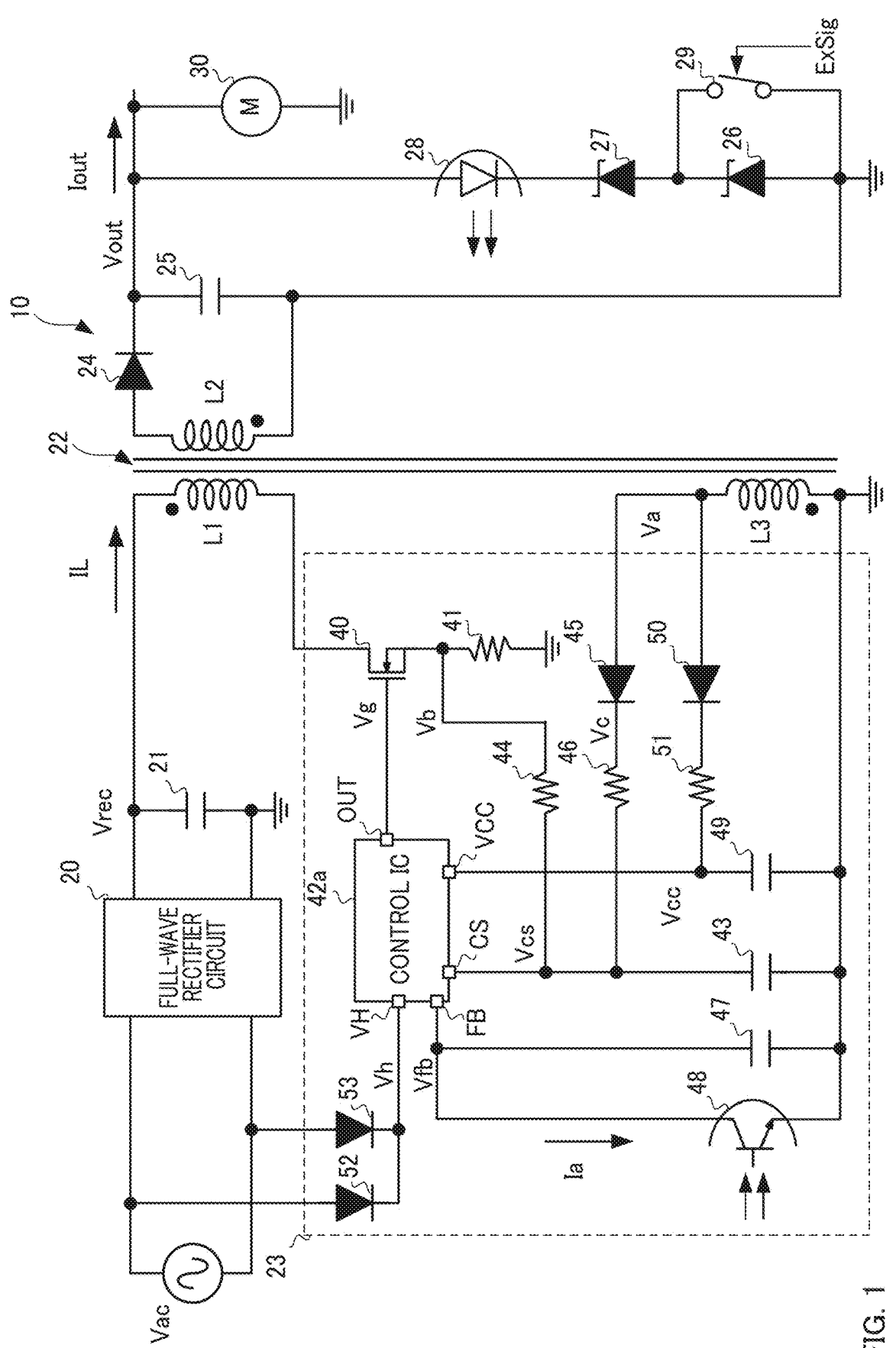
FIG. 1 is a diagram illustrating a configuration example of an AC-DC converter 10.

At least following matters will become apparent from the descriptions of the present description and the accompanying drawings. Hereinafter, embodiments of the present disclosure will be described with reference to the drawings. The same or equivalent constituent elements, members, and the like illustrated in the drawings are given the same reference numerals, and repetitive description is omitted as appropriate.

Embodiments

FIG. 1 is a diagram illustrating a configuration example of an AC-DC converter 10 which is an embodiment of the present disclosure. The AC-DC converter 10 is a flyback power supply circuit that generates an output voltage Vout at a target level from an alternating-current (AC) voltage Vac of a commercial power supply.

<<<Overview of AC-DC Converter 10>>>

The AC-DC converter 10 includes a full-wave rectifier circuit 20, capacitors 21 and 25, a transformer 22, a control block 23, a diode 24, Zener diodes 26 and 27, a light-emitting diode 28, and a switch 29. The AC-DC converter 10 supplies power to a motor 30.

The full-wave rectifier circuit 20 full-wave rectifies the predetermined AC voltage Vac inputted thereto and outputs a resultant voltage, as a voltage Vrec, to a primary coil L1 of the transformer 22 and the capacitor 21. The capacitor 21 smooths the voltage Vrec. Note that the AC voltage Vac is a voltage having an effective value in a range of from 100 to 240 V and a frequency in a range of from 50 to 60 Hz, for example.

The transformer 22 includes the primary coil L1, and a secondary coil L2 and an auxiliary coil L3 that are magnetically connected to the primary coil L1. The secondary coil L2 and the auxiliary coil L3 are wound such that voltages generated at the secondary coil L2 and the auxiliary coil L3 have a polarity opposite to the polarity of the voltage generated at the primary coil L1.

The control block 23 controls an inductor current IL flowing through the primary coil L1 on the primary side of the transformer 22, to thereby control the voltage generated at the secondary coil L2 on the secondary side of the transformer 22. As a result, the output voltage Vout of the target level is generated on the secondary side of the transformer 22.

The diode 24 rectifies the current from the secondary coil L2 of the transformer 22, and supplies the rectified current to the capacitor 25. The capacitor 25 is charged with the current from the diode 24, and thus the output voltage Vout is generated across the capacitor 25.

The Zener diodes 26 and 27 and the light-emitting diode 28 are provided in series between the cathode of the diode 24 and the ground, and the Zener diodes 26 and 27 are connected in series such that the voltage corresponding to the output voltage Vout will be the reverse voltage. The light-emitting diode 28 is provided between the cathode of the diode 24 and the cathode of the Zener diode 27.

The Zener diodes 26 and 27 are elements that output constant voltage upon receipt of the reverse voltage.

The light-emitting diode 28 is an element that emits light having an intensity according to the voltage between the output voltage Vout and the cathode of the Zener diode 27.

The switch 29 is connected in parallel with the Zener diode 26 and is turned on and off in response to an external signal ExSig from a device (not illustrated) that controls the motor 30. The switch 29 is turned on in response to the motor 30 entering a standby state.

Note that the AC-DC converter 10 outputs the output voltage Vout at a first target level (for example, 4 V), upon turning on of the switch 29, and outputs the output voltage Vout at a second target level (for example, 32 V), upon turning off of the switch 29.

Further, the operation mode of the AC-DC converter 10 when the AC-DC converter 10 is outputting the output voltage Vout at the first target level is referred to as "low voltage mode". Meanwhile, the operation mode of the AC-DC converter 10 when the AC-DC converter 10 is outputting the output voltage Vout at the second target level is referred to as "normal mode". The "low voltage mode" corresponds to a "first mode", and the "normal mode" corresponds to a "second mode".

The motor 30 is a load connected to the AC-DC converter 10, and the output voltage Vout is applied to the motor 30. The current flowing through the motor 30 is referred to as output current Iout.

<<<Overview of Control Block 23>>>

The control block 23 is a circuit block to control the AC-DC converter 10. The control block 23 includes a power transistor 40, resistors 41, 44, 46, and 51, a control IC 42*a*, capacitors 43, 47, and 49, diodes 45, 50, 52, and 53, and a phototransistor 48.

The power transistor 40 is an N-channel metal-oxide-semiconductor (NMOS) transistor to control power to be supplied to the motor 30. In an embodiment of the present disclosure, it is assumed that the power transistor 40 is a Metal Oxide Semiconductor (MOS) transistor, but it is not limited thereto. As long as the power transistor 40 is a transistor capable of controlling power, the power transistor 40 may be a bipolar transistor or the like, for example.

The resistor 41 is a resistor to detect the inductor current L flowing through the primary coil L1 when the power transistor 40 is on, and the resistor 41 has one end connected to the source electrode of the power transistor 40, and the other end that is grounded.

The control IC 42*a* is an integrated circuit that controls switching of the power transistor 40 such that the output voltage Vout is at the target level. In specific, the control IC 42*a* drives the power transistor 40, based on the inductor current IL and the output voltage Vout.

The control IC 42*a* has terminals CS, FB, OUT, VCC, and VH, and the details of the control IC 42*a* will be described later. The gate electrode of the power transistor 40 is connected to the terminal OUT. The control IC 42*a* actually has other terminals as well, however, they are omitted for convenience.

The capacitor 43 is provided between the terminal CS and the ground, and receives, through the resistor 44, the voltage at the resistor 41 that is generated with the inductor current IL flowing. The capacitor 43 and the resistor 44 configure a low-pass filter, to stabilize a voltage Vcs at the terminal CS. Note that the terminal CS corresponds to a "third terminal" and the capacitor 43 corresponds to a "second capacitor".

The diode 45 has an anode connected to the auxiliary coil L3, and a cathode connected to the terminal CS through the resistor 46. When the power transistor 40 is off, the voltage corresponding to a voltage Va at the auxiliary coil L3, in other words, the voltage at the capacitor 43, is applied to the terminal CS.

The capacitor 47 is provided between the terminal FB and the ground, to stabilize a voltage Vfb at the terminal FB. The voltage Vfb is a feedback voltage corresponding to the output voltage Vout, and is applied to the terminal FB. The control IC 42*a* turns on the power transistor 40 with a frequency according to the voltage Vfb. Usually, in response to the voltage Vcs exceeding the voltage Vfb while the power transistor 40 is on, the control IC 42*a* turns off the power transistor 40.

The phototransistor 48 is provided between the terminal FB and the ground, and configures a photo coupler with the light-emitting diode 28 on the secondary side of the transformer 22. When the intensity of the light emitted by the light-emitting diode 28 increases, the phototransistor 48 passes a larger sink current Ia to the terminal FB.

Although details will be described later, when the switch 29 is turned on and the target level of the output voltage Vout is changed to the first target level, the voltage applied to the light emitting diode 28 rises, and the intensity of the light emitted by the light emitting diode 28 increases. In this case, the sink current Ia increases, resulting in a drop in the voltage Vfb.

Meanwhile, in response to the switch 29 being turned off and the target level of the output voltage Vout being changed to the second target level, the voltage applied to the light emitting diode 28 drops, and the intensity of the light emitted by the light emitting diode 28 decreases. In this case, the sink current Ia decreases, resulting in a rise in the voltage Vfb.

Further, as will be described later in detail, when the voltage Vfb drops, the inductor current IL flowing through the primary coil L1 decreases, resulting in a drop in the output voltage Vout outputted from the secondary coil L2.

Meanwhile, when the voltage Vfb rises, the inductor current IL flowing through the primary coil increases, resulting in a rise in the output voltage Vout outputted from the secondary coil L2.

The capacitor 49 is provided between the terminal VCC and the ground. The diode 50 has an anode connected to the auxiliary coil L3, and a cathode connected to the terminal VCC through the resistor 51. The voltage Va generated at the auxiliary coil L3 is applied to the capacitor 49 through the diode 50 and the resistor 51, and the voltage at the capacitor 49 results in a power supply voltage Vcc of the control IC 42*a*.

The terminal VCC receives the voltage corresponding to the voltage Va at the auxiliary coil L3 when the power transistor 40 is off, in other words, the voltage with which the capacitor 49 is charged. Further, the capacitance value of the capacitor 49 is larger than the capacitance value of the capacitor 43, and the power supply voltage Vcc is less likely to drop, as compared to the voltage Vcs. The terminal VCC corresponds to a "first terminal", and the capacitor 49 corresponds to a "first capacitor".

Further, as described above, the voltage Vfb changes with a change in the target level of the output voltage Vout, and determines the current value of the inductor current IL. In other words, the output voltage Vout determines the current value of the inductor current IL. With a change in the current value of the inductor current IL, the output voltage Vout drops or rises, and the voltage Va changes, and thus changes the voltage Vcs when the power transistor 40 is off.

Accordingly, upon a change in the target level of the output voltage Vout, the voltage Vcs when the power transistor 40 is off also changes. Thus, it is possible to detect a change in the target level of the output voltage Vout, by detecting a change in the voltage Vcs.

The diodes 52 and 53 full-wave rectify the AC voltage Vac, to thereby generate a rectified voltage Vh. Note that the rectified voltage Vh is applied to the terminal VH of the control IC 42*a*.

<<<Configuration of Control IC 42*a*>>>

Figure 2:
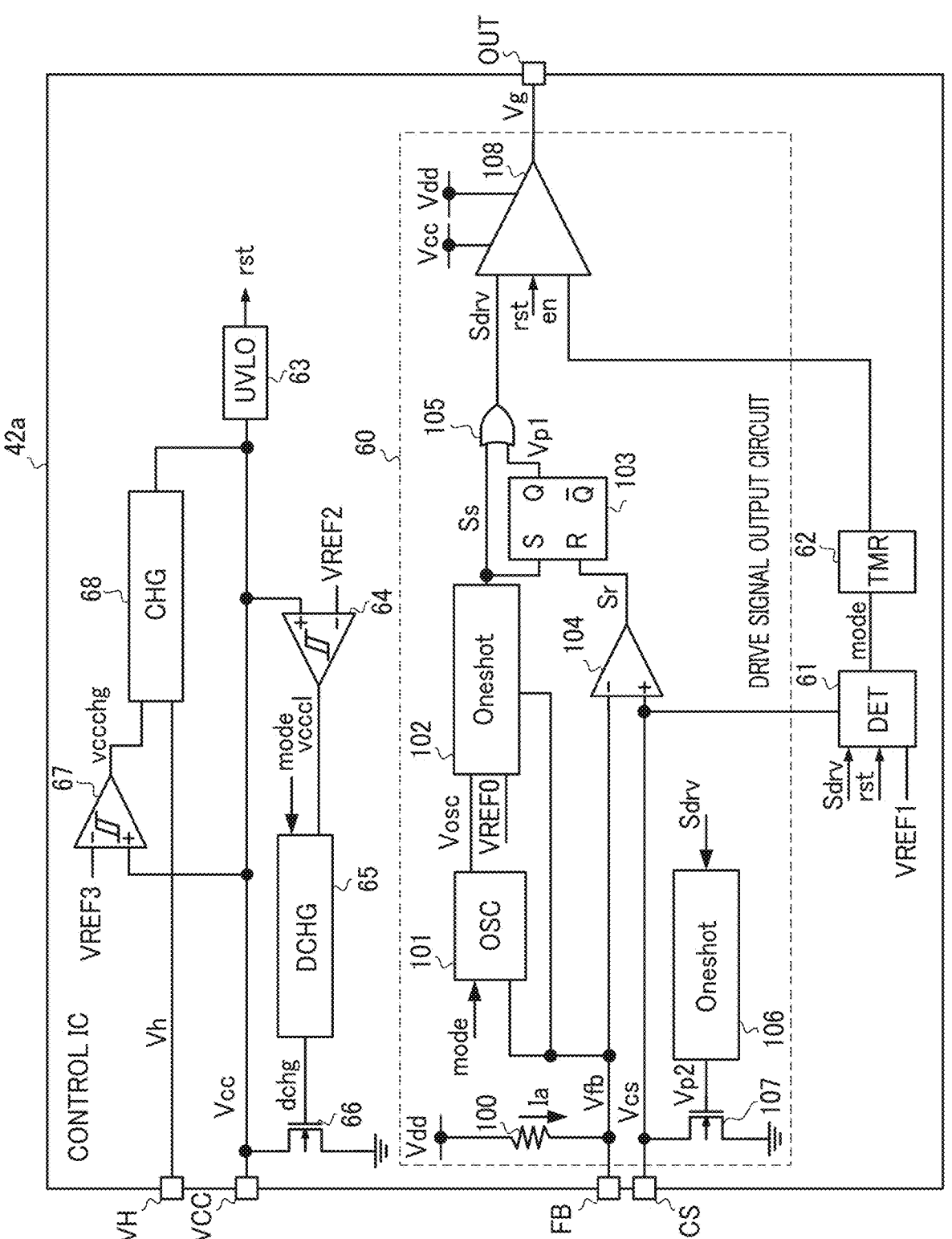

FIG. 2 is a diagram illustrating a configuration example of the control IC 42*a*. The control IC 42*a* includes a drive signal output circuit 60, a detection circuit 61, a timer 62, an under voltage lock out (UVLO) 63, hysteresis comparators 64 and 67, a discharging circuit 65, an NMOS transistor 66, and a charging circuit 68.

<<Drive Signal Output Circuit 60>>

The drive signal output circuit 60 outputs a drive voltage Vg to the power transistor 40 to drive the power transistor 40, according to the operation mode of the AC-DC converter 10. Specifically, the drive signal output circuit 60 outputs a drive signal of the drive voltage Vg of the power supply voltage Vcc to the power transistor 40, after it is detected that the operation mode of the AC-DC converter 10 is the "low voltage mode. Meanwhile, when it is detected that the operation mode of the AC-DC converter 10 is the "normal mode", the drive signal output circuit 60 outputs the drive signal of a predetermined level lower than the power supply voltage Vcc to the power transistor 40.

The drive signal output circuit 60 includes a resistor 100, an oscillator circuit 101, one-shot circuits 102 and 106, an SR flip-flop 103, a comparator 104, an OR circuit 105, an NMOS transistor 107, and a buffer 108.

The resistor 100 is provided between the terminal FB and a node that receives an internal voltage Vdd generated from the power supply voltage Vcc by an internal power supply (not illustrated), to thereby generate the voltage Vfb corresponding to the sink current Ia to be passed by the phototransistor 48.

The oscillation circuit (OSC) 101 outputs an oscillator signal Vosc with a frequency Fsw corresponding to the voltage Vfb and a signal mode from the detection circuit 61 (described later). Specifically, when the AC-DC converter 10 operates in the "low-voltage mode", that is, when the detection circuit 61 (described later) outputs a high signal mode, the oscillator circuit 101 outputs the oscillator signal Vosc with a predetermined frequency. Meanwhile, when the AC-DC converter 10 operates in the "normal mode", that is, when the detection circuit 61 outputs a low signal mode, the oscillator circuit 101 outputs the oscillator signal Vosc with an oscillation frequency rising in turn according to the voltage Vfb.

The one shot circuit 102 outputs a pulse signal Ss at the rising edge of the oscillator signal Vosc. In specific, when the voltage Vfb is lower than a reference voltage VREF0, the one shot circuit 102 stops outputting the pulse signal Ss. Meanwhile, when the voltage Vfb is higher than the reference voltage VREF0, the one shot circuit 102 outputs the pulse signal Ss with the frequency Fsw corresponding to the frequency Fsw of the oscillator signal Vosc.

Upon receiving the pulse signal Ss outputted by the one shot circuit 102, the SR flip-flop 103 outputs a signal Vp1 of a high level (hereinafter, referred to as high or high level. Meanwhile, upon receiving a high signal Sr outputted by the comparator 104, the SR flip-flop 103 outputs the signal Vp1 at a low level (hereinafter, referred to as low or low level), which will be described later in detail.

The comparator 104 is a circuit that compares the voltage Vcs when the power transistor 40 is on with the voltage Vfb, and outputs the high signal Sr in response to the voltage Vcs exceeding the voltage Vfb. In response to the voltage Vcs when the power transistor 40 is on dropping below the voltage Vfb, the comparator 104 outputs a low signal Sr.

Note that the voltage Vcs may be inputted, as a voltage Vcs1, to the comparator 104 through a slope compensation circuit (not illustrated). In this case, the voltage Vcs1 is compared with the voltage Vfb, and in response to the voltage Vcs1 exceeding the voltage Vfb, the comparator 104 outputs the high signal Sr. Meanwhile, when the voltage Vcs1 does not exceed the voltage Vfb, the comparator 95 outputs the low signal Sr.

Accordingly, in response to the voltage Vcs exceeding the voltage Vfb, and the comparator 104 outputting the high signal Sr, the SR flip-flop 103 outputs a low signal Vp1. Thus, in response to the voltage Vcs exceeding the voltage Vfb, the power transistor 40 is turned off.

The OR circuit 105 obtains a logical sum of the pulse signal Ss and the signal Vp1, to thereby output a resultant signal as a signal Sdrv. That is, in response to the pulse signal Ss or the signal Vp1 going high, the OR circuit 105 outputs a high signal Sdrv. Meanwhile, in response to the pulse signal Ss and the signal Vp1 going low, the OR circuit 105 outputs a low signal Sdrv.

The one-shot circuit (Oneshot) 106 is a circuit that turns on the NMOS transistor 107, and discharges the capacitor 43 connected to the terminal CS, upon turning on of the power transistor 40, that is, at the rising edge of the signal Sdrv.

Specifically, in response to the OR circuit 105 outputting the high signal Sdrv, the one shot circuit 106 outputs a pulse signal Vp2 having a pulse width shorter than an ON period Ton of the power transistor 40.

The buffer 108 amplifies the signal Sdrv and applies the drive voltage Vg to drive the power transistor 40 to the terminal OUT, based on the power supply voltage Vcc. Specifically, the buffer 108 applies the drive voltage Vg to turn on the power transistor 40 to the terminal OUT, in response to the high signal Sdrv. Meanwhile, the buffer 108 applies the drive voltage Vg (for example, a ground voltage) to turn off the power transistor 40 to the terminal OUT, in response to the low signal Sdrv.

Although details will be described later, the buffer 108 changes its operation, in response to a signal en outputted by the timer 62 according to the operation mode of the AC-DC converter 10. Further, the buffer 108 stops operating, in response to the under voltage lock out 63 outputting a high reset signal rst to stop the operation of the buffer 108.

===Configuration of Buffer 108===

Figure 3:
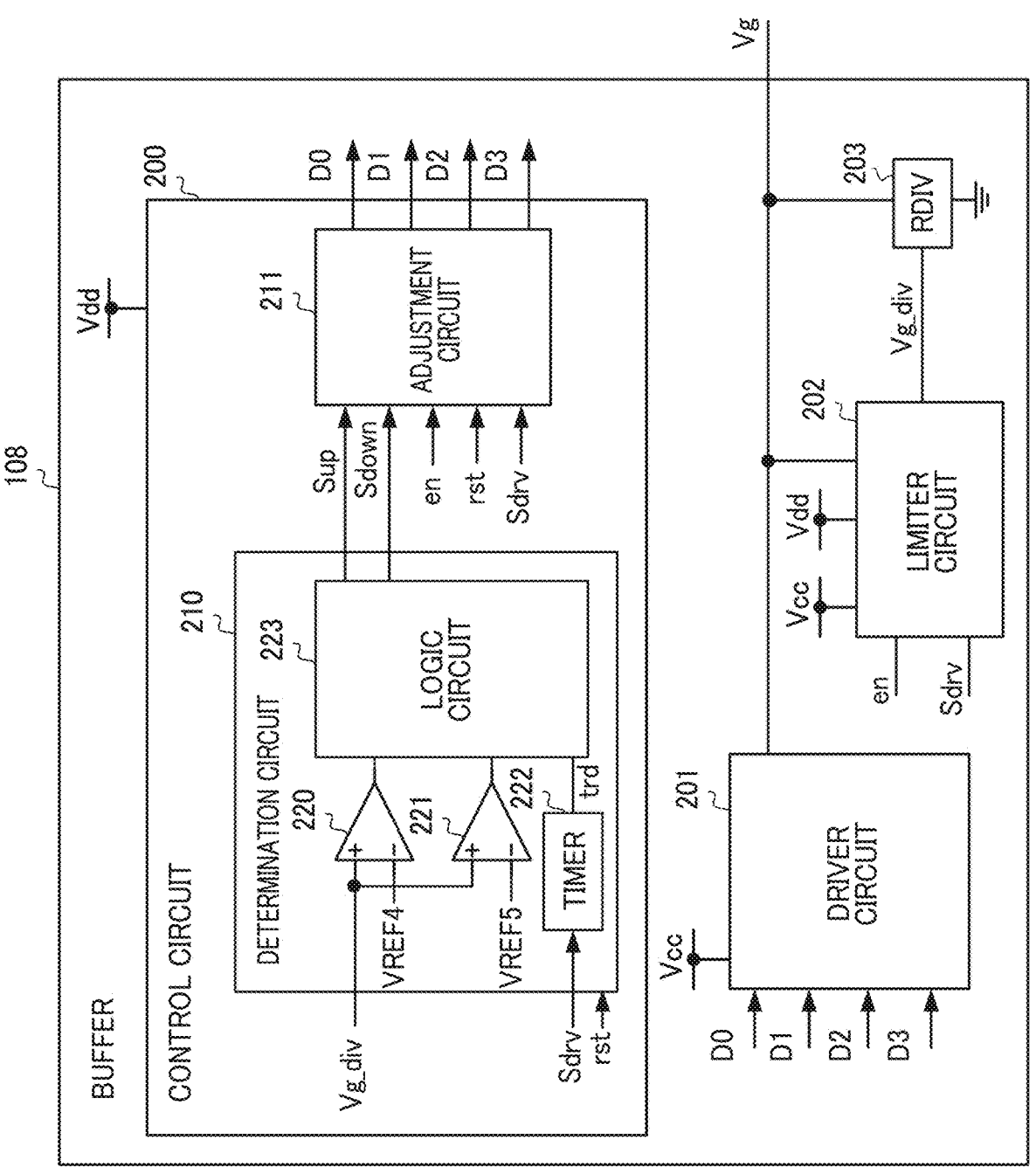
FIG. 3 is a diagram illustrating a configuration example of a buffer 108.

FIG. 3 is a diagram illustrating a configuration example of the buffer 108. The buffer 108 includes a control circuit 200, a driver circuit 201, a limiter circuit 202, and a voltage divider circuit 203.

The control circuit 200 determines the time period during which the driver circuit 201 drives the power transistor 40. Further, the control circuit 200 outputs signals D0 to D3, to thereby control the driver circuit 201.

The driver circuit 201 is a voltage driver circuit that drives the power transistor 40 using voltage, in response to the signals D0 and the like from the control circuit 200.

The limiter circuit 202 is a current driver circuit that drives the power transistor 40 using current, by supplying current to or receiving current from the terminal OUT of the control IC 42a, based on a voltage Vg_div and the signals en and Sdrv.

Further, the voltage divider circuit (RDIV) 203 divides the drive voltage Vg, to thereby output resultant voltage as the voltage Vg_div. Note that details of the control circuit 200, the driver circuit 201, and the limiter circuit 202 will be described later.

==Configuration of Control Circuit 200==

The control circuit 200 includes a determination circuit 210, and an adjustment circuit 211, and outputs the signals D0 to D3, based on the voltage Vg_div, the signal Sdrv, and a reset signal rst.

Further, the control circuit 200 outputs the signals D0 and the like such that the drive voltage Vg falls within the predetermined range described later, to thereby control the driver circuit 201, based on the voltage Vg_div.

The determination circuit 210 determines whether the voltage Vg falls within a predetermined range (that is, whether the voltage Vg_div falls between a reference voltage VREF4 (for example, 1.4 V) and a reference voltage VREF5 (for example, 1.5 V)).

Specifically, in response to the voltage Vg_div continuously exceeding the reference voltage VREF5 while a timer 222 (described later) outputs the rising edge of a clock signal trd three times, the determination circuit 210 outputs a low signal Sup and a high signal Sdown to the adjustment circuit 211, which will be described later. Further, in response to the voltage Vg_div being continuously below the reference voltage VREF4 while the timer 222 outputs the rising edge of the clock signal trd three times, the determination circuit 210 outputs a high signal Sup and a low signal Sdown to the adjustment circuit 211. In cases other than the above, the determination circuit 210 outputs the low signals Sup and Sdown.

The determination circuit 210 includes comparators 220 and 221, the timer 222, and a logic circuit 223, and controls signals generated by the adjustment circuit 211, which will be described later.

The comparator 220 is a circuit that determines whether the voltage Vg_div is higher than the reference voltage VREF4, and the comparator 221 is a circuit that determines whether the voltage Vg_div is higher than the reference voltage VREF5.

The timer 222 is a circuit that outputs the clock signal trd to operate the determination circuit 210. The timer 222 outputs a high clock signal trd after a lapse of a predetermined time ta since the signal Sdrv goes high, and outputs a low clock signal trd in response to the signal Sdrv going low. Note that the predetermined time period ta is shorter than the time period during which the signal Sdrv is high.

The logic circuit 223 holds the outputs of the comparators 220 and 221 at the rising edge of the clock signal trd from the timer 222. The logic circuit 223 outputs the high signal Sup and the low signal Sdown when the voltage Vg_div is continuously lower than the reference voltage VREF4 during the time period during which the clock signal trd rises three times.

Meanwhile, the logic circuit 223 outputs the low signal Sup and the high signal Sdown, when the voltage Vg_div is continuously higher than the reference voltage VREF5 during the time period during which the clock signal trd rises three times. Further, the logic circuit 223 outputs the low signals Sup and Sdown, when the voltage Vg_div is lower than the reference voltage VREF4 or does not continue to be higher than the reference voltage VREF5, during the time period during which the clock signal trd rises three times.

Further, the adjustment circuit 211 outputs the signals D0 to D3 to control the driver circuit 201, in response to the signals Sup and Sdown and the signal en.

Further, the adjustment circuit 211 increases the voltage drive period for causing the driver circuit 201 to drive the power transistor 40 with voltage, in response to the signal Sup going high, and reduces the voltage drive period, in response to the signal Sdown going high. Further, the adjustment circuit 211 maintains the voltage drive period when the signals Sup and Sdown are low.

Specifically, the adjustment circuit 211 adjusts the time period during which the high control signals D0 to D2 are outputted, according to the length of the voltage drive period. Note that the configuration and operation of the driver circuit 201 will be described below.

==Configuration and Operation of Driver Circuit 201 and Operation of Adjustment Circuit 211==

Figure 4:
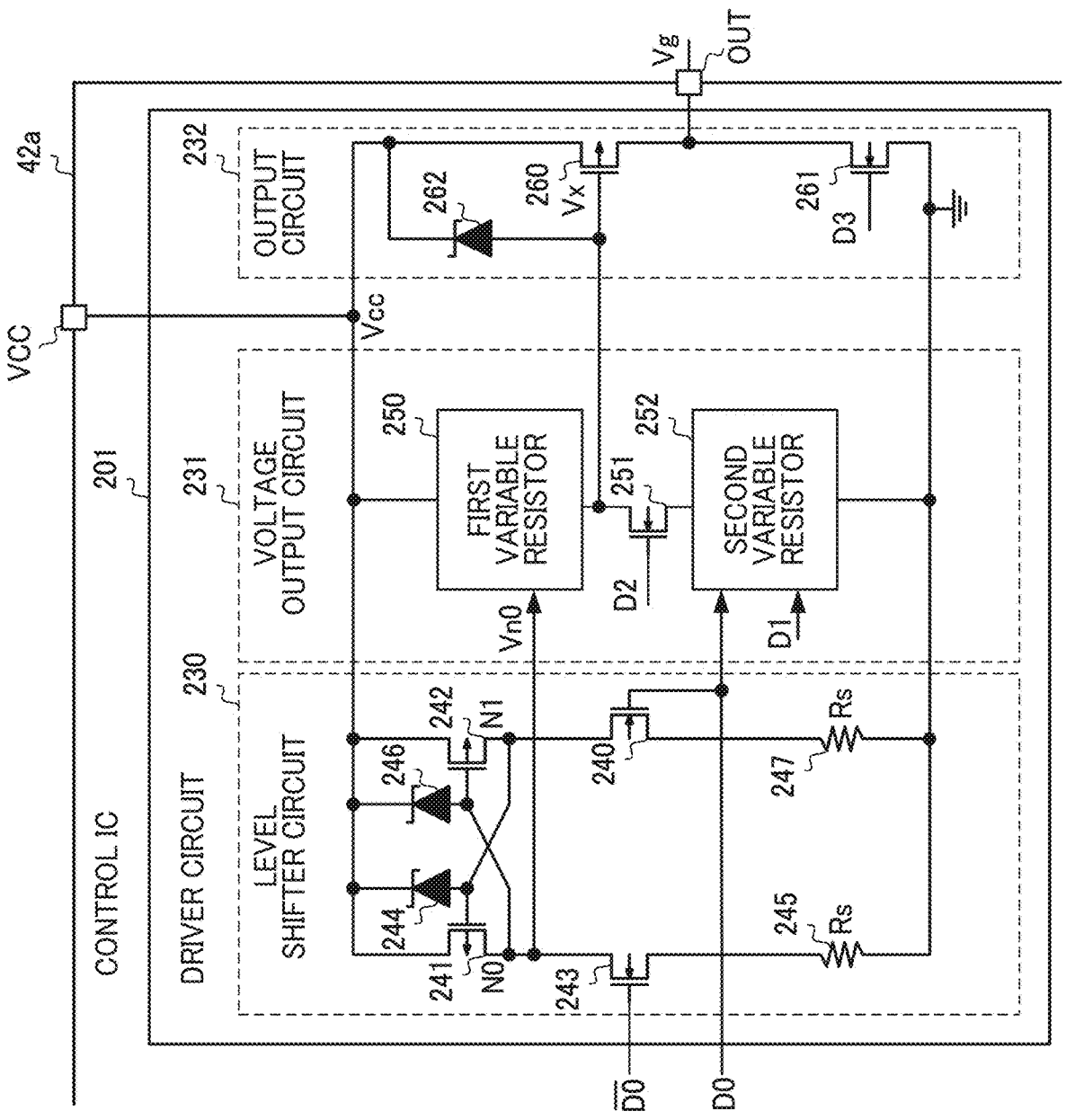
FIG. 4 is a diagram illustrating a configuration example of a driver circuit 201.

FIG. 4 is a diagram illustrating an example of the driver circuit 201. The adjustment circuit 211 in FIG. 3 will be described first, and then the driver circuit 201 will be described. In response to the determination circuit 210 outputting the high signal Sup when the timer 62 (described later) outputs the high signal en, the adjustment circuit 211 increases the time period during which the control signals D0 to D2 are high. Meanwhile, in response to the determination circuit 210 outputting the high signal Sdown when the timer 62 outputs the high signal en, the adjustment circuit 211 reduces the time period during which the control signals D0 to D2 are high. Note that the time period during which any of the control signals D0 to D2 is high corresponds to the voltage drive period.

Further, in response to the timer 62 outputting the high signal en and the OR circuit 105 outputting the high signal Sdrv, the adjustment circuit 211 outputs the control signals D0 and the like to the driver circuit 201 so as to sequentially transition to four states, which are a state 1, a state 2, a state 3, and a non-driving state. The logic levels of the control signals D0 to D3 in each of the states are as illustrated in FIG. 5 and will be described below.

As illustrated in FIG. 5, in the state 1, the adjustment circuit 211 causes the control signals D0 to D2 to be high, and causes the signal D3 to be low. In the state 2, the adjustment circuit 211 causes the control signal D0 to be low, the control signals D1 and D2 to be high, and the control signal D3 to be low. In the state 3, the adjustment circuit 211 causes the control signals D0 and D1 to be low, the control signal D2 to be high, and the control signal D3 to be low. In the non-driving state, the adjustment circuit 211 causes the control signals D0 to D2 to be low, and the control signal D3 to be low.

Meanwhile, as illustrated in FIG. 5, in response to the timer 62 outputting a low signal en and the OR circuit 105 outputting the high signal Sdrv, the adjustment circuit 211 outputs the control signals D0 and like to the driver circuit 201, so as to sequentially transition to two states, which are a state 4 and a state 5. Regarding the logic levels of the control signals D0 and the like in each of the states, the logic levels thereof in the state 4 are the same as in the state 1, and the logic levels thereof in the state 5 are the same as in the state 3.

Further, when the OR circuit 105 outputs the low signal Sdrv, the logic levels of the control signals D0 to D3 are as illustrated in FIG. 5 as follows: the control signals D0 to D2 are low and the control signal D3 is high, regardless of the logic level of the signal en.

The driver circuit 201 in FIG. 4 voltage-drives the power transistor 40, and includes a level shifter circuit 230, a voltage output circuit 231, and an output circuit 232.

The level shifter circuit 230 is a circuit that converts the control signal D0 to operate with the voltage Vdd into a signal Vn0 to operate with the power supply voltage Vcc. The level shifter circuit 230 includes NMOS transistors 240 and 243, P-channel metal-oxide-semiconductor (PMOS) transistors 241 and 242, resistors 245 and 247, and Zener diodes 244 and 246.

In other words, the level shifter circuit 230 outputs the signal Vn0 having the logic level of the control signal D0. Specifically, in response to the control circuit 200 outputting the high control signal D0, the level shifter circuit 230 outputs a high signal Vn0, and in response to the control circuit 200 outputting the low control signal D0, the level shifter circuit 230 outputs a low signal Vn0.

The voltage output circuit 231 controls a gate voltage Vx of a PMOS transistor 260 (described later) of the output circuit 232, in response to the control signals D0 to D2 and the signal Vn0. The voltage output circuit 231 includes a first variable resistor 250, an NMOS transistor 251, and a second variable resistor 252.

The first variable resistor 250 changes a resistance value in response to the signal Vn0, and the second variable resistor 252 changes a resistance value in response to the control signals D0 and D1, to thereby limit the current flowing through a Zener diode 262 (described later). The second variable resistor 252 is connected to the first variable resistor 250 through the NMOS transistor 251 in the states 1 to 3 in which the control signal D2 is high.

Specifically, the first variable resistor 250 and the second variable resistor 252 generate the gate voltage Vx of the PMOS transistor 260 so as to be the minimum in the state 1, to thereby maximize the driving capability of the PMOS transistor 260. Then, as the state is shifting from the state 2 to the state 3, the gate voltage Vx is raised, to thereby reduce the driving capability of the PMOS transistor 260. Then, in the non-driving state, the gate voltage Vx that is the voltage Vcc is applied to the PMOS transistor 260, to thereby stop the driving of the terminal OUT performed by the PMOS transistor 260. Note that the states 4 and 5 are the same as in the states 1 and 3, respectively.

The output circuit 232 is a circuit in which the PMOS transistor 260 having received the gate voltage Vx voltage-drives the terminal OUT, and includes the PMOS transistor 260, an NMOS transistor 261, and the Zener diode 262.

====Operation of Driver Circuit 201 when Signal Sdrv is High and Signal En is High====

When the signal Sdrv is high and the signal en is high, the driver circuit 201 operates through the four states: the states 1, 2, and 3, and the non-driving state.

From the above-described configuration, in response to the timer 62 outputting the high signal en, the driver circuit 201 causes the PMOS transistor 260 to reduce the driving capability in a stepwise manner and increase the on-resistance in a stepwise manner, with a rise in the gate voltage Vx according to the transition of the state from the state 1 to the non-driving state. Here, the "driving capability" refers to the ability of the PMOS transistor 260 to output how much current to the terminal OUT.

Specifically, the driver circuit 201 applies the minimum gate voltage Vx to the PMOS transistor 260 in the state 1, provides the maximum driving capability to the PMOS transistor 260, and minimizes the on-resistance of the PMOS transistor 260.

Then, the driver circuit 201 applies the gate voltage Vx higher than that in the state 1 to the PMOS transistor 260 in the state 2, provides the driving capability smaller than that in the state 1 to the PMOS transistor 260, and increases the on-resistance of the PMOS transistor 260 larger than that in the state 1.

Further, in the state 3, the driver circuit 201 applies the gate voltage Vx higher than that in the state 2 to the PMOS transistor 260, provides the driving capability smaller than that in the state 2 to the PMOS transistor 260, and increases the on-resistance of the PMOS transistor 260 larger than that in the state 2.

Lastly, the driver circuit 201 applies the gate voltage Vx that is the power supply voltage Vcc, to the PMOS transistor 260 in the non-driving state, turns off the PMOS transistor 260, and maximizes the on-resistance of the PMOS transistor 260.

Specifically, the operation of the driver circuit 201 in each of the states from the state 1 to the non-driving state will be described below, and how the gate voltage Vx changes will be described.

====Operation of Driver Circuit 201 in State 1====

In the state 1, the control circuit 200 causes the control signals D0 to D2 to be high, and causes the control signal D3 to be low.

Thus, in the level shifter circuit 230 in the state 1, in response to the control circuit 200 outputting the high control signal D0, the NMOS transistor 240 is turned on, to thereby operate so as to cause the logic level at a node N1 to be low. Then, the PMOS transistor 241 is turned on, and the logic level at the node NO goes high. As a result, the PMOS transistor 242 is turned off, and the level shifter circuit 230 outputs the high signal Vn0.

Further, the Zener diode 244 is connected, as a clamp element, between the gate and the source of the PMOS transistor 241. The Zener diode 244 is a circuit that protects the PMOS transistor 241 such that an excessive voltage is not applied between the gate and the source of the PMOS transistor 241 when the PMOS transistor 241 is turned on.

However, upon turning on of the PMOS transistor 241, a potential difference between the power supply voltage Vcc and the node N1 having a reduced potential is applied across the Zener diode 244. As a result, the current flowing through the Zener diode 244 increases, the voltage clamped by the Zener diode 244 becomes excessive, and the gate-source voltage of the PMOS transistor 241 may exceed the withstand voltage of the PMOS transistor 241.

Further, in order to prevent exceeding of the withstand voltage of the PMOS transistor 241, the current flowing through the Zener diode 244 is limited with a resistance value Rs.

In response to the level shifter circuit 230 outputting the high signal Vn0, the first variable resistor 250 raises the gate voltage Vx of the PMOS transistor 260 to the voltage Vcc. However, since the NMOS transistor 251 is turned on in response to the high control signal D2, the second variable resistor 252 is connected to the first variable resistor 250. Accordingly, the gate voltage Vx of the PMOS transistor 260 results in the minimum voltage generated based on the voltage Vcc by the first variable resistor 250, the second variable resistor 252, and the Zener diode 262.

In this event, assuming that the resistance value of the second variable resistor 252 is R2a, the potential of the source electrode of the NMOS transistor 251 is 5 V−Vgs because the high signal D2 (that is, the signal D2 of 5 V) is inputted to the gate electrode of the NMOS transistor 251, where, Vgs is the gate-source voltage of the NMOS transistor 251.

The potential of the source electrode of the NMOS transistor 251 does not change, even if the power supply voltage Vcc changes. Thus, a current Ids251a flowing through the NMOS transistor 251 does not change either, and the current Ids251a results in a current to pull down the gate electrode of the PMOS transistor 260. Further, the impedance between the power supply voltage Vcc and the gate electrode of the PMOS transistor 260 is a combined resistance value of the resistance value of the Zener diode 262 and the resistance value R1a (R1a is the resistance value of the first variable resistor 250) because they are connected in parallel.

Thus, the gate voltage Vx of the PMOS transistor 260 results in the following relational expression.

$$Vx = Vcc - (Vz + Rz \times Ids251a)/(1 + Rz/R1a) \qquad (1)$$

where, Vz is the voltage at which the current starts to flow through the Zener diode 262, Rz is the operating resistance of the Zener diode 262, and the current Ids251a is the pull-down current of the gate electrode of the PMOS transistor 260 in the state 1 (that is, the drain-source current of the NMOS transistor 251).

The output circuit 232 applies the gate voltage Vx outputted by the voltage output circuit 231 to the PMOS transistor 260, to thereby generate the voltage Vg. Note that the NMOS transistor 261 is off, because the control signal D3 is low.

====Operation of Driver Circuit 201 in State 2====

In the state 2, the control circuit 200 causes the control signal D0 to be low, the control signals D1 and D2 to be high, and the control signal D3 to be low.

Thus, in the level shifter circuit 230 in the state 2, in response to the control circuit 200 outputting the low control signal D0, the NMOS transistor 243 is turned on, to operate so as to cause the logic level at the node NO to be low. As in the operation of the level shifter circuit 230 in the state 1 described above, the PMOS transistor 242 is turned on, and the level shifter circuit 230 outputs the low signal Vn0.

Then, while the control circuit 200 is in the state 2 and the control signal D0 is low, the current flowing through the Zener diode 246 is limited with the resistance value Rs.

In response to the level shifter circuit 230 outputting the low signal Vn0, the first variable resistor 250 raises the gate voltage Vx of the PMOS transistor 260 to the voltage Vcc. However, because the NMOS transistor 251 is turned on in response to the high control signal D2, the second variable resistor 252 is connected to the first variable resistor 250. As a result, the gate voltage Vx of the PMOS transistor 260 results in the voltage generated based on the voltage Vcc by the first variable resistor 250, the second variable resistor 252, and the Zener diode 262. The gate voltage Vx in this case is higher than the gate voltage Vx in the state 1.

In this event, the impedance between the voltage Vcc and the gate electrode of the PMOS transistor 260 is a combined resistance value of the resistance value of the Zener diode 262 and the resistance value of the first variable resistor 250 (R1b is the resistance value of the first variable resistor 250) since they are connected in parallel. Note that the resistance value R1b is smaller than the resistance value R1a.

The second variable resistor 252 has a resistance value R2*b*, and the current Ids251*b* in this event has a value smaller than the current Ids251*a*. Note that the resistance value R2*b* is greater than the resistance value R2*a*.

Here, the current Ids251*b* is (5 V–Vgs2)/R2*b*. Note that the voltage Vgs2 is slightly smaller than Vgs in the state 1, because the current Ids251*b* flowing through the NMOS transistor 251 is smaller than the current Ids251*a* in the state 1.

Thus, the gate voltage Vx of the PMOS transistor 260 results in the following relational expression.

$$Vx = Vcc - (Vz + Rz \times Ids251b)/(1 + Rz/R1b) \tag{2}$$

where, Vz is the voltage at which the current starts to flow through the Zener diode 262, and Rz is the operating resistance when the current flows through the Zener diode 262. Further, the current Ids251*b* is a current to pull down the gate electrode of the PMOS transistor 260 in the state 2 (that is, the drain-source current of the NMOS transistor 251).

The output circuit 232 applies the gate voltage Vx outputted by the voltage output circuit 231 to the PMOS transistor 260, to thereby generate the voltage Vg. Note that the NMOS transistor 261 is off because the control signal D3 is low.

====Operation of Driver Circuit 201 in State 3====

In the state 3, the control circuit 200 causes the control signals D0 and D1 to be low, and the control signal D2 to be high, and the control signal D3 to be low.

Thus, in response to the control circuit 200 outputting the low control signal D0, the level shifter circuit 230 in the state 3 outputs the low signal Vn0, as in the state 2.

In response to the level shifter circuit 230 outputting low signal Vn0, the first variable resistor 250 raises the gate voltage Vx of the PMOS transistor 260 to the voltage Vcc. However, since the NMOS transistor 251 is turned on in response to the high control signal D2, the second variable resistor 252 is connected to the first variable resistor 250. Accordingly, the gate voltage Vx of the PMOS transistor 260 results in the voltage generated based on the voltage Vcc by the first variable resistor 250, the second variable resistor 252, and the Zener diode 262. The gate voltage Vx in this case is higher than the gate voltage Vx in the state 2.

In this event, the resistance value of the second variable resistor 252 is R2*c*, and the pull-down current Ids251*c* of the gate electrode of the PMOS transistor 260 in this event has a value further smaller than Ids251*b*. Note that the resistance value R2*c* is greater than the resistance value R2*b*.

Here, the current Ids251*c* is (5 V-Vgs3)/R2*c*. Note that the voltage Vgs3 is slightly smaller than Vgs2 in the state 2, because the current Ids251*c* flowing through the NMOS transistor 251 is smaller than the current Ids251*b* in the state 2.

Thus, the gate voltage Vx of the PMOS transistor 260 results in the following relational expression.

$$Vx = Vcc - (Vz + Rz \times Ids251c)/(1 + Rz/R1b) \tag{3a}$$

where, Vz is the voltage at which the current starts to flow through the Zener diode 262, and Rz is the operating resistance when the current flows through the Zener diode 262. Further, the current Ids251*c* is the pull-down current of the gate electrode of the PMOS transistor 260 in the state 3 (that is, the drain-source current of the NMOS transistor 251).

Further, when the voltage difference between the voltage Vx and the power supply voltage Vcc decreases smaller than the voltage Vz and current does not flow through the Zener diode 262, the gate voltage Vx of the PMOS transistor 260 results in the following relational expression.

$$Vx = Vcc - R1b \times Ids122c \tag{3b}$$

The output circuit 232 applies the gate voltage Vx outputted by the voltage output circuit 231 to the PMOS transistor 260, to thereby generate the voltage Vg. Note that the NMOS transistor 261 is off because the control signal D3 is low.

====Operation of Driver Circuit 201 in Non-Driving State====

In the non-driving state, the control circuit 200 causes the control signals D0 to D2 to be low, and causes the control signal D3 to be low.

Thus, since the control signal D0 in the non-driving state does not change from that in the state 3, the description of the level shifter circuit 230 is omitted.

In response to the level shifter circuit 230 outputting the low signal Vn0, the first variable resistor 250 raises the gate voltage Vx of the PMOS transistor 260 to the voltage Vcc. Because the NMOS transistor 251 is turned off in response to the low control signal D2, the second variable resistor 252 is not connected to the first variable resistor 250. Accordingly, the gate voltage Vx of the PMOS transistor 260 results in the voltage Vcc.

The output circuit 232 applies the gate voltage Vx outputted by the voltage output circuit 231 to the PMOS transistor 260, to thereby generate the voltage Vg. Note that the NMOS transistor 261 is off because the control signal D3 is low.

From the above, when transitioning from the state 1 to the state 3, the PMOS transistor 260 gradually reduces the driving capability, and the gate voltage Vx also gradually rises, and the on-resistance of the power transistor 40 gradually increases as well.

Further, the voltage drive period has a time period that is in the state 1 in which the driving capability is relatively high, and a time period that is in the state 2, 3, in which the driving capability is relatively low, after the state 1.

Note that in the state 1, the gate voltage Vx of the PMOS transistor 260 is a voltage that has dropped from the power supply voltage Vcc by about 5 V. In the state 2, the gate voltage Vx of the PMOS transistor 260 is a voltage that has dropped from the power supply voltage Vcc by about 3 V, and in the state 3, the gate voltage Vx of the PMOS transistor 260 is a voltage that has dropped from the power supply voltage Vcc by about 2.5 V.

Accordingly, the PMOS transistor 260 reduces the driving capability in a stepwise manner, with a rise in the gate voltage Vx according to the transition of the state from the state 1 to the non-driving state, to thereby increase the on-resistance in a stepwise manner. In an embodiment of the present disclosure, it is assumed that the gate voltage Vx is changed in a stepwise manner, but may be changed in a gradual manner.

====Operation of Driver Circuit 201 when Signal Sdrv is High and Signal en is Low====

When the signal Sdrv is high and the signal en is low, the driver circuit 201 operates through two states that are the states 4 and 5.

From the above configuration, in response to the detection circuit 61 outputting the low signal en, the driver circuit 201 causes the PMOS transistor 260 to reduce the driving capability in a stepwise manner, with a rise in the gate voltage Vx according to the transition of the state from the state 4 to the state 5, to thereby increase the on-resistance in a stepwise manner.

Specifically, the driver circuit 201 applies the minimum gate voltage Vx to the PMOS transistor 260 in the state 4, provides the maximum driving capability to the PMOS transistor 260, and minimizes the on-resistance of the PMOS transistor 260.

Then, the driver circuit 201 applies the gate voltage Vx higher than that in the state 4 to the PMOS transistor 260 in the state 5, provides the driving capability smaller than that in the state 4 to the PMOS transistor 260, and increases the on-resistance of the PMOS transistor 260 larger than that in the state 4.

Specifically, the operation of the driver circuit 201 will be described below in each of the states from the state 4 to the state 5, and how the gate voltage Vx changes will be described.

====Operation of Driver Circuit 201 in State 4====

In the state 4, the control circuit 200 causes the control signals D0 to D2 to be high and the control signal D3 to be low, as in the state 1.

Thus, in the level shifter circuit 230 in the state 4, in response to the control circuit 200 outputting the high control signal D0, the NMOS transistor 240 is turned on, to thereby operate such that the logic level at the node N1 goes low. Thus, the level shifter circuit 230 operates such that the PMOS transistor 241 is turned on, the logic level at the node NO goes high, and as a result, the PMOS transistor 242 is turned off. Then, the level shifter circuit 230 outputs the high signal Vn0.

In response to the level shifter circuit 230 outputting the high signal Vn0, the first variable resistor 250 raises the gate voltage Vx of the PMOS transistor 260 to the voltage Vcc. However, since the NMOS transistor 251 is turned on in response to the high control signal D2, the second variable resistor 252 is connected to the first variable resistor 250. Accordingly, the gate voltage Vx of the PMOS transistor 260 results in the minimum voltage generated based on the voltage Vcc by the first variable resistor 250, the second variable resistor 252, and the Zener diode 262. The gate voltage Vx in this event is generated based on the relational expression (1) in the state 1.

The output circuit 232 applies the gate voltage Vx outputted by the voltage output circuit 231 to the PMOS transistor 260, to thereby generate the voltage Vg. Note that the NMOS transistor 261 is off because the control signal D3 is low.

====Operation of Driver Circuit 201 in State 5====

In the state 5, the control circuit 200 causes the control signals D0 and D1 to be low, the control signal D2 to be high, and the control signal D3 to be low, as in the state 3.

Thus, the level shifter circuit 230 in the state 5 operates such that in response to the control circuit 200 outputting the low control signal D0, the NMOS transistor 243 is turned on and the logic level at the node NO goes low. Thus, the level shifter circuit 230 outputs the low signal Vn0.

In response to the level shifter circuit 230 outputting the low signal Vn0, the first variable resistor 250 raises the gate voltage Vx of the PMOS transistor 260 to the voltage Vcc. However, because the NMOS transistor 251 is turned on in response to the high control signal D2, the second variable resistor 252 is connected to the first variable resistor 250. As a result, the gate voltage Vx of the PMOS transistor 260 results in the voltage generated based on the voltage Vcc by the first variable resistor 250, the second variable resistor 252, and the Zener diode 262. The gate voltage Vx in this case is higher than the gate voltage Vx in the state 4. The gate voltage Vx in this event is generated based on the relational expression (3a) or (3b) in the state 1.

The output circuit 232 applies the gate voltage Vx outputted by the voltage output circuit 231 to the PMOS transistor 260, to thereby generate the voltage Vg. Note that the NMOS transistor 261 is off because the control signal D3 is low.

From the above, in response to the state transitioning from the state 4 to the state 5, the PMOS transistor 260 reduces the driving capability, the gate voltage Vx rises, and the on-resistance of the power transistor 40 increases as well.

Further, the voltage drive period has a time period that is in the state 4 in which the driving capability is relatively high, and a time period that is in the state 5, in which the driving capability is relatively low, after the state 4.

Accordingly, the PMOS transistor 260 changes the driving capability in a stepwise manner, with a change in the gate voltage Vx according to the transition of the state from the state 4 to the state 5, to thereby change the on-resistance in a stepwise manner as well. In this event, the voltage Vg results in the power supply voltage Vcc.

====Operation of Driver Circuit 201 when Signal Sdrv is Low====

When the signal Sdrv is low, the driver circuit 201 operates so as to cause the voltage Vg to reach the ground level through the terminal OUT, because the control circuit 200 outputs the high control signal D3. When the signal Sdrv is low, the logic levels of the control signals D0 to D3 are such that the logic levels of the control signals D0 to D2 are low and the logic level of the control signal D3 is low, regardless of the logic level of the signal en. The following describes the operation of the driver circuit 201 when the signal Sdrv is low.

The level shift circuit 230 when the signal Sdrv is low operates such that in response to the control circuit 200 outputting the low control signal D0, the NMOS transistor 243 is turned on, and the logic level at the node NO goes low. Then, the PMOS transistor 242 is turned on, and the logic level at the node N1 goes high. As a result, the PMOS transistor 241 is turned off, and the level shifter circuit 230 outputs the low signal Vn0.

In response to the level shifter circuit 230 outputting the low signal Vn0, the first variable resistor 250 raises the gate voltage Vx of the PMOS transistor 260 to the voltage Vcc. Because the NMOS transistor 251 is turned off in response to the low control signal D2, the second variable resistor 252 is not connected to the first variable resistor 250. Accordingly, the gate voltage Vx of the PMOS transistor 260 results in the voltage Vcc.

The output circuit 232 turns on the NMOS transistor 261, because the control circuit 200 outputs the high control signal D3. In this event, the voltage Vg reaches the ground voltage. Note that because the gate voltage Vx results in the power supply voltage Vcc, the PMOS transistor 260 is off.

====Configuration and Operation of Limiter Circuit 202====

Figure 6:
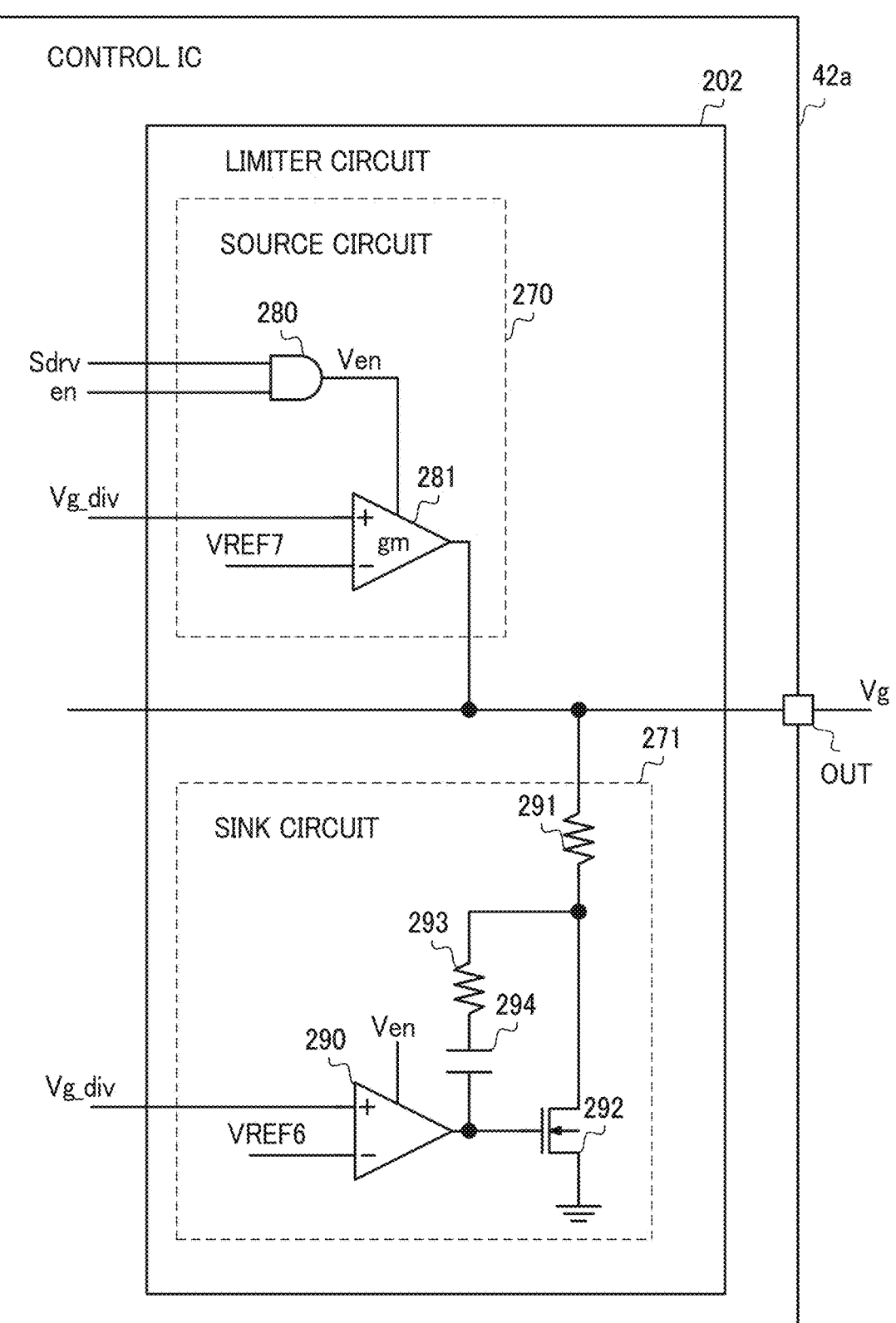
FIG. 6 is a diagram illustrating a configuration example of a limiter circuit 202.

FIG. 6 is a diagram illustrating an example of the limiter circuit 202. When the signal Sdrv is high and the signal en is high, the limiter circuit 202 supplies a source current to the terminal OUT, receives a sink current from the terminal OUT, and includes a source circuit 270 and a sink circuit 271. Further, the limiter circuit 202 stops operating when the signal en is low.

The source circuit 270 supplies the source current to the terminal OUT according to the difference between the voltage Vg_div and a reference voltage VREF7 (for example, 1.5 V), and includes an AND circuit 280 and a voltage control current source circuit (Operational Transconductance Amplifier) 281.

The AND circuit 280 performs a logical product of the signal Sdrv and the signal en, to thereby output a resultant signal as a signal Ven. When the signal Ven is high, the voltage control current source circuit 281 operates. On the other hand, when the signal Ven is low, the voltage control current source circuit 281 stops operating. Note that the time period during which the signal Ven is high is defined as a current drive period. Further, the current drive period is longer than the voltage drive period, and includes at least a part of the voltage drive period.

The voltage control current source circuit 281 operates so as to supply the source current to the terminal OUT according to the difference between the voltage Vg_div and the reference voltage VREF7 such that the voltage Vg_div will be equal to the reference voltage VREF7.

Accordingly, when the voltage Vg_div is higher than the reference voltage VREF7, the source current stops. In contrast, when the voltage Vg_div is lower than the reference voltage VREF7, the source current increases, to thereby raise the voltage Vg gradually. Note that the reference voltage VREF7 is set higher than the threshold value of the power transistor 40 and lower than the withstand voltage of the power transistor 40. Here, the "withstand voltage" refers to the withstand voltage between the gate and source of the power transistor 40.

The sink circuit 271 generates the sink current to receive a current from the terminal OUT according to the difference between the voltage Vg_div and a reference voltage VREF6 (for example, 1.6 V). The sink circuit 271 includes a comparator 290, a current limiting resistor 291, an NMOS transistor 292 serving as an output transistor, a phase compensation resistor 293, and a capacitor 294. Note that although the comparator 290 is used in an embodiment of the present disclosure, an operational amplifier may be used instead.

When the signal Ven is high, the comparator 290 operates. Meanwhile, the comparator 290 is designed so as not to operate and turn off the NMOS transistor 292, when the signal Ven is low, and thus the sink current does not flow. That is, when the signal Ven is low, the sink circuit 271 stops operating.

That is, when the voltage Vg_div is higher than the reference voltage VREF6, a current is supplied to the gate electrode of the NMOS transistor 292, to thereby reduce the on-resistance of the NMOS transistor 292. In contrast, when the voltage Vg_div is lower than the reference voltage VREF6, a current is received from the gate electrode of the NMOS transistor 292, to thereby increase the on-resistance of the NMOS transistor 292.

In response to the on-resistance of the NMOS transistor 292 decreasing, the sink circuit 271 receives more sink current from the terminal OUT through the resistor 291. In contrast, in response to the on-resistance of the NMOS transistor 292 increasing, the sink circuit 271 receives, from the terminal OUT, the sink current smaller than that when the on-resistance of the NMOS transistor 292 is low.

Accordingly, when the voltage Vg_div is higher than the reference voltage VREF6, the sink current increases more than that when the voltage Vg_div is lower than the reference voltage VREF6. That is, when the voltage Vg_div is higher than the reference voltage VREF6, the sink current will further increase, thereby being able to suppress the rise in the voltage Vg. Note that the reference voltage VREF6 is set higher than the reference voltage VREF7 and lower than the withstand voltage of the power transistor 40. Further, the limiter circuit 202 has a smaller driving capability than the driver circuit 201.

====Example of Operation of Buffer 108 when Signal En is High====

The following describes the operation of the buffer 108 when the signal en is high. Note that, in FIG. 7, the output current Iout is illustrated such that the current outputted from the terminal OUT is negative.

Figure 7:
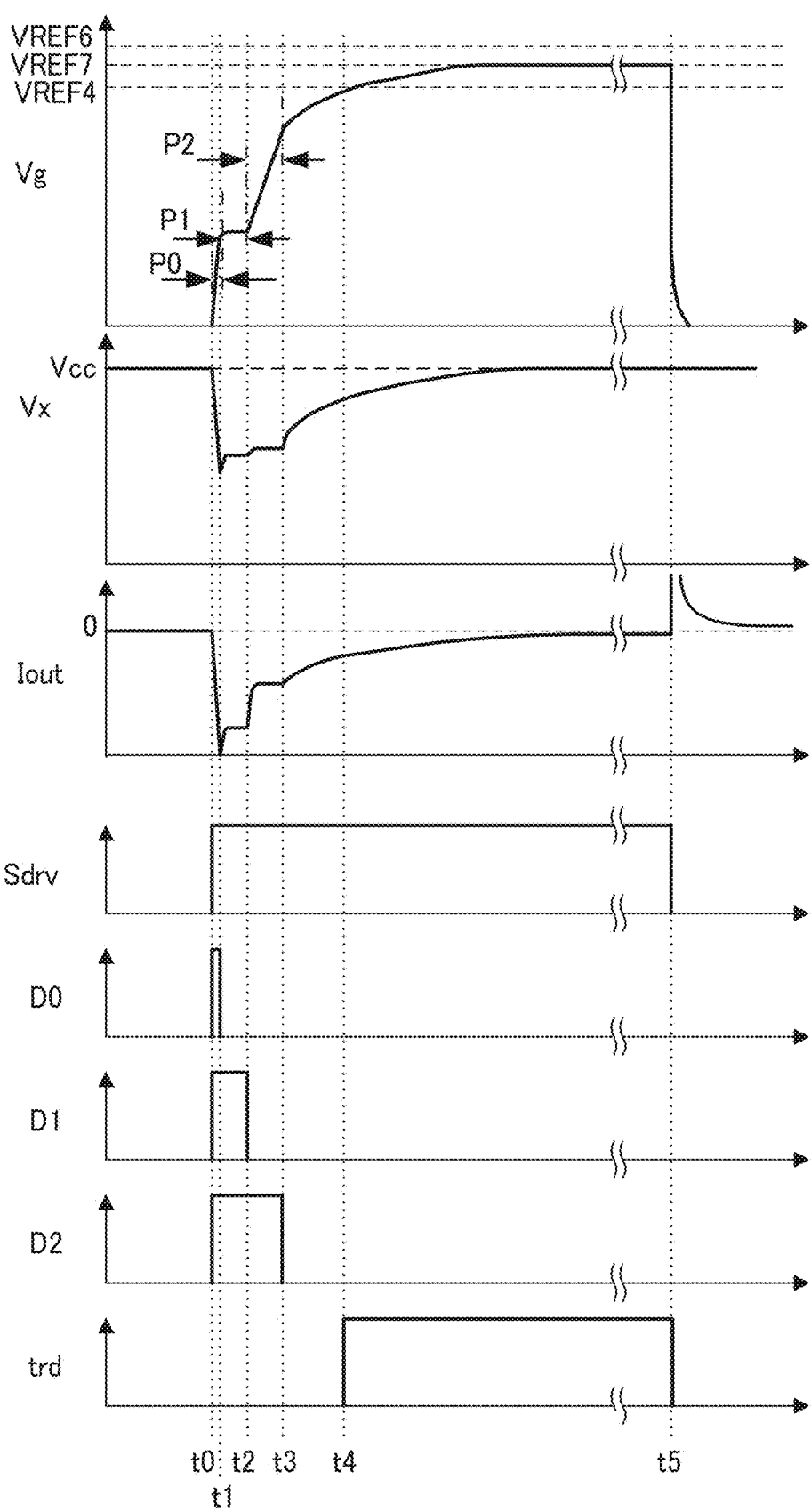
FIG. 7 is a diagram illustrating an example of an operation of a buffer 108.

FIG. 7 is a diagram illustrating an example of the operation of the buffer 108 when the voltage Vg is lower than the lower limit level. Further, FIG. 7 is a diagram illustrating the operation of the buffer 108 when the reset signal rst is high and the voltage drive period is in an initial state.

At time to, in response to the OR circuit 105 outputting the high signal Sdrv, the adjustment circuit 211 outputs the high control signals D0 to D2 in the state 1, and the voltage drive period starts. In this event, the adjustment circuit 211 outputs the low control signal D3.

Further, the limiter circuit 202 supplies the source current to the terminal OUT according to the voltage Vg_div. Then, the timer 222 starts to measure the predetermined time period ta.

In this event, the gate voltage Vx of the PMOS transistor 260 reaches the minimum voltage, the driving capability of the PMOS transistor 260 reaches the maximum, the on-resistance reaches the minimum, and the output current Iout reaches the maximum. As a result, the voltage Vg rises with the maximum slope.

Note that during a period P0 illustrated in FIG. 7, a parasitic capacitance Cgs between the gate and source of the power transistor 40 is charged with the current corresponding to the gate voltage Vx of the PMOS transistor 260 until the power transistor 40 changes from the off state to the on state. Thus, the voltage Vg rises rapidly.

At time t1, the adjustment circuit 211 outputs the low control signal D0 in the state 2.

In this event, the gate voltage Vx of the PMOS transistor 260 exceeds the voltage in the state 1, and as compared to the case in the state 1, the driving capability of the PMOS transistor 260 decreases, the on-resistance increases, and the output current Iout decreases. As a result, the voltage Vg remains flat.

Note that during a period P1, the power transistor 40 is on, and thus the voltage at the drain electrode of the power transistor 40 is lowered. In this event, the parasitic capacitance Cgd between the gate and drain of the power transistor 40 is charged with the current corresponding to the gate voltage Vx of the PMOS transistor 260. Thus, the drop in the voltage at the drain electrode of the power transistor 40 caused by turning on of the power transistor 40 and the charging of the parasitic capacitance Cgd reach equilibrium, and thus the voltage Vg remains flat.

At time t2, the adjustment circuit 211 outputs the low control signal D1 in the state 3.

In this event, the gate voltage Vx of the PMOS transistor 260 exceeds the voltage in the state 2, and as compared to the states 1 and 2, the driving capability of the PMOS transistor 260 further decreases, the on-resistance further increases, and the output current Iout further decreases. As a result, the voltage Vg increases with a smaller slope than that in the state 1.

Note that during a period P2, the drain voltage of the power transistor 40 sufficiently approaches the ground voltage. The parasitic capacitances Cgd and Cgs of the power transistor 40 are charged with the current corresponding to the gate voltage Vx of the PMOS transistor 260, so that the voltage Vg rises. Because the gate voltage Vx of the PMOS transistor 260 is higher than that in the period P0, the voltage Vg rises gradually.

During the periods P1 and P2, the driver circuit 201 charges the parasitic capacitance of the power transistor 40 while reducing the drive capability during the voltage drive period, in order to turn on the power transistor 40, and, after the change in voltage level of the output electrode of the power transistor 40 and the above-described charging reach equilibrium, the driver circuit 201 further charges the parasitic capacitance of the power transistor 40.

As a result, the driver circuit 201 discontinuously changes the rate of rise in the voltage Vg to drive the power transistor 40 in order to turn on the power transistor 40. That is, the voltage Vg first rises at a large slope A1, based on the charging current to turn on the power transistor 40. Then, upon turning on of the power transistor 40, a slope A2 of the voltage Vg decreases based on the change in the charge current caused by the turning on of the power transistor 40, and the voltage Vg becomes almost flat. Thereafter, when the power transistor 40 is further on by virtue of the charge current, the change in the charging current becomes stable, and the voltage Vg rises with a slope A3 that is smaller than the slope A1. Accordingly, the voltage Vg rises with two inflection points. Note that, in an embodiment of the present disclosure, the "inflection point" refers to a point at which the slope of the voltage Vg changes.

At time t3, the adjustment circuit 211 outputs the low control signal D2 in the non-driving state, and the voltage drive period ends.

In this event, the gate voltage Vx of the PMOS transistor 260 is pulled up and gradually reaches the power supply voltage Vcc.

At time t4, at which the predetermined time period ta has elapsed since time to, the timer 222 outputs a high clock signal trd.

In this event, the voltage Vg is lower than the lower limit level (that is, the voltage Vdr_div is lower than the reference voltage VREF4). Accordingly, when the voltage Vg_div is lower than the reference voltage VREF4 two more times at the rising edge of the clock signal trd, the determination circuit 210 outputs the signal Sup.

In response to the OR circuit 105 outputting the low signal Sdrv at time t5, the timer 222 outputs the low clock signal trd.

Further, the limiter circuit 202 stops supplying the source current to the terminal OUT according to the voltage Vg_div.

====Example of Operation of Buffer 108 when Signal En is Low====

Figure 8:
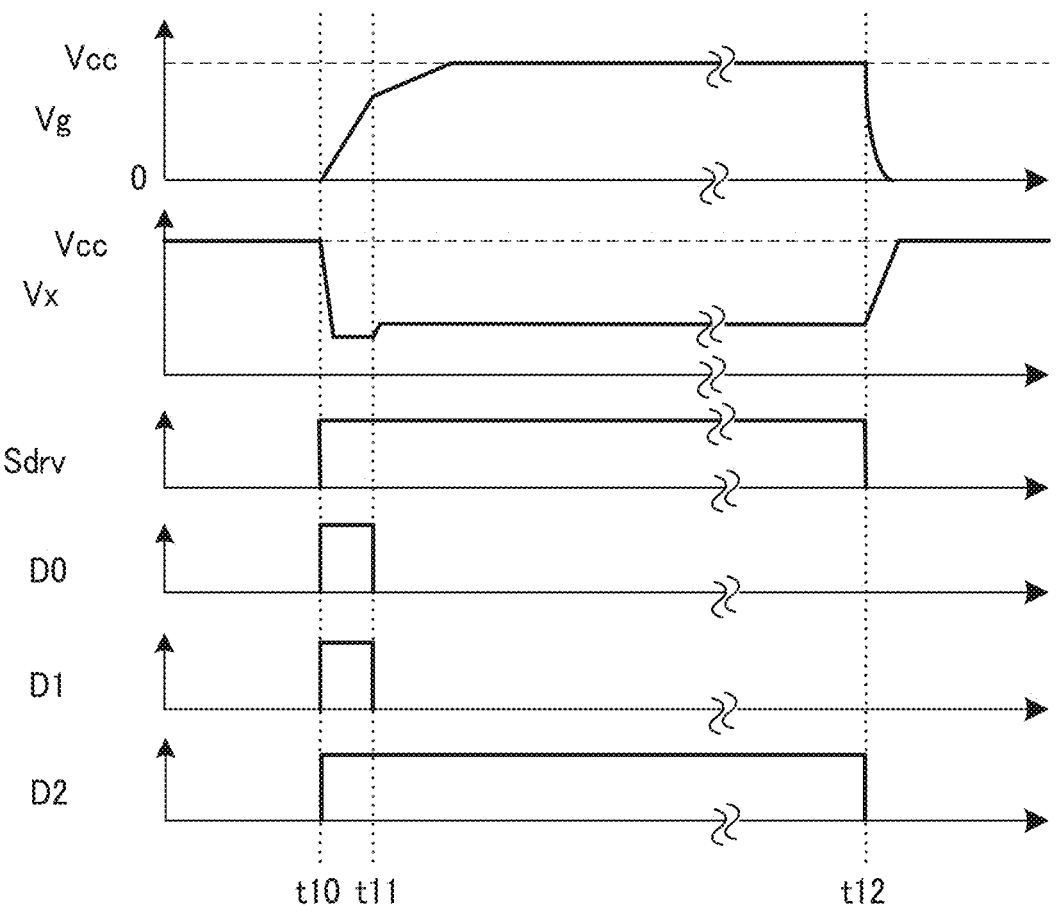
FIG. 8 is a diagram illustrating an example of an operation of a buffer 108.

The following describes the operation of the buffer 108 when the signal en is low. FIG. 8 is a diagram illustrating an example of the operation of the buffer 108 when the signal en is low.

In response to the OR circuit 105 outputting the high signal Sdrv at time t10, the adjustment circuit 211 outputs the high control signals D0 to D2. In this event, the adjustment circuit 211 outputs the low control signal D3.

Further, because the signal en is low, the limiter circuit 202 stops operating.

In this event, in the state 4, the gate voltage Vx of the PMOS transistor 260 reaches the minimum voltage, the driving capability of the PMOS transistor 260 reaches the maximum, and the on-resistance reaches the minimum. As a result, the voltage Vg rises with the maximum slope.

The power supply voltage Vcc of the drive voltage is lower than that in the state described with reference to FIG. 7, and the state in which the gate voltage Vx is the minimum may continue for a long time. Accordingly, such a transition of the voltage Vg with two inflection points as described using the periods P0 to P2 is not obtained.

At time t11, the adjustment circuit 211 outputs the low control signals D0 to D1 in the state 5.

In this event, the gate voltage Vx of the PMOS transistor 260 exceeds the voltage in the state 4, and as compared to the state 4, the driving capability of the PMOS transistor 260 decreases, and the on-resistance increases. As a result, the voltage Vg rises with a smaller slope than that in the state 4. Then, the voltage Vg becomes flat, at the point at which the voltage Vg reaches the power supply voltage Vcc.

In response to the OR circuit 105 outputting the low signal Sdrv at time t12, the adjustment circuit 211 outputs the low control signal D2.

As such, with the buffer 108 changing its operation in response to the signal en from the timer 62, the control IC 42a can operate with low power consumption when the AC-DC converter 10 operates in the "low voltage mode".

<<Detection Circuit 61>>

The detection circuit (DET) 61 detects that the target level of the output voltage Vout has changed, with the external signal ExSig. Specifically, the detection circuit 61 outputs the high signal mode, in response to the time period during which the voltage Vcs when the power transistor 40 is off (that is, when receiving the low signal Sdrv) is lower than a reference voltage VREF1 continuing for a predetermined time period since the switch 29 in FIG. 1 is turned on. Note that in this case, the detection circuit 61 detects that the operation mode of the AC-DC converter 10 is the "low voltage mode".

Meanwhile, the detection circuit 61 outputs the low signal mode, in response to the switch 29 being turned off and the voltage Vcs when the power transistor 40 is off exceeding the reference voltage VREF1. Note that in this case, the detection circuit 61 detects that the operation mode of the AC-DC converter 10 is the "normal mode". Further, in response to the under voltage lock out 63 (described later) outputting the high reset signal rst, the detection circuit 61 outputs a low signal mode.

Accordingly, upon turning on of the switch 29, the control IC 42a drives the power transistor 40 so as to maintain the output voltage Vout that has dropped to the first target level. Since the coil voltage of the auxiliary coil L3 in FIG. 1 drops in association therewith, the control IC 42a located on the primary side of the transformer 22 can detect that the target level of the output voltage Vout has dropped, by detecting the voltage Vcs when the power transistor 40 is off. Note that the detection circuit 61 corresponds to a "mode detection circuit".

<<Timer 62>>

When it is detected that the operation mode of the AC-DC converter 10 is the "low voltage mode", the timer 62 measures a predetermined time period P so as to maintain the operation of the buffer 108 at the time when the operation mode of the AC-DC converter 10 is the "normal mode" until the power supply voltage Vcc sufficiently lowers.

Specifically, in response to the detection circuit 61 outputting the high signal mode, the timer 62 outputs the low signal en after a lapse of the predetermined time period P, and in response to the detection circuit 61 outputting the low signal mode, the timer 62 outputs the high signal en. That is, the limiter circuit 202 (illustrated in FIGS. 3 and 6) of the buffer 108 stops operating after the predetermined time period P has elapsed since the AC-DC converter 10 has entered the "low voltage mode".

Accordingly, the control IC 42a does not change the operation of the buffer 108, until the predetermined time period P has elapsed since the AC-DC converter 10 has started operating in the "low voltage mode" and the discharge circuit 65 (described later) completes the discharging of the capacitor 49. This enables the control IC 42a to prevent the buffer 108 from driving the power transistor 40 by the drive voltage Vg of the power supply voltage Vcc higher than the withstand voltage of the power transistor 40. Note that the timer 62 corresponds to a "timer".

<<Under Voltage Lock Out 63>>

The under voltage lock out (UVLO) 63 resets the control IC 42a, when the power supply voltage Vcc is equal to or lower than a first predetermined voltage (for example, 6.5 V). Specifically, in response to the power supply voltage Vcc being equal to or lower than the first predetermined voltage, the under voltage lock out 63 outputs the high reset signal rst to reset the control IC 42a. On the other hand, in response to the power supply voltage Vcc being higher than a second predetermined voltage (for example, 10 V), the under voltage lock out 63 outputs a low signal rst.

Further, the drive signal output circuit 60 outputs the drive signal to the power transistor 40 regardless of the operation mode of the AC-DC converter 10, so as to restrain the operation from being stopped by the under voltage lock out 63. Note that the under voltage lock out 63 corresponds to a "determination circuit", and the level of the first predetermined voltage corresponds to a "second level".

<<<Hysteresis Comparator 64>>>

The hysteresis comparator 64 detects whether the capacitor 49 in FIG. 1 has been sufficiently discharged, that is, whether the power supply voltage Vcc has sufficiently dropped. Specifically, the hysteresis comparator 64 detects whether the power supply voltage Vcc has dropped below a reference voltage VREF2.

The hysteresis comparator 64 outputs a high signal vcccl, when the power supply voltage Vcc is higher than the reference voltage VREF2, and outputs a low signal vcccl, in response to the power supply voltage Vcc dropping below the reference voltage VREF2. Note that the hysteresis comparator 64 corresponds to a "second detection circuit".

<<Discharge Circuit 65>>

When it is detected that the operation mode of the AC-DC converter 10 is the "low voltage mode", the discharge circuit (DCHG) 65 turns on the NMOS transistor 66, to thereby discharge the capacitor 49 in FIG. 1 and lower the power supply voltage Vcc. Specifically, in response to the high signal mode from the detection circuit 61, the discharge circuit 65 turns on the NMOS transistor 66, discharges the capacitor 49, and lowers the power supply voltage Vcc to the reference voltage VREF2.

Meanwhile, in response to the hysteresis comparator 64 outputting the low signal vcccl, the discharge circuit 65 turns off the NMOS transistor 66 and stops discharging the capacitor 49. Accordingly, the control IC 42a can restrain the power supply voltage Vcc from becoming higher than necessary when the AC-DC converter 10 operates in the "low voltage mode". This enables the control IC 42a to restrain the buffer 108 from driving the power transistor 40 by the drive voltage Vg higher than the withstand voltage of the power transistor 40. Note that the reference voltage VREF2 corresponds to a "first level".

<<<Hysteresis Comparator 67>>>

The hysteresis comparator 67 restrains, together with the charging circuit 68, the power supply voltage Vcc from dropping and the operation of the buffer 108 from stopping when the AC-DC converter 10 operates in the "low voltage mode".

Specifically, the hysteresis comparator 67 outputs a high signal vccchg, when the power supply voltage Vcc is higher than a reference voltage VREF3, which is higher than the first predetermined voltage. Meanwhile, in response to the power supply voltage Vcc dropping below the reference voltage VREF3, the hysteresis comparator 67 outputs a low signal vccchg. Note that the hysteresis comparator 67 corresponds to a "first detection circuit", and the level of the reference voltage VREF3 corresponds to a "third level".

<<Charging Circuit 68>>

In response to the power supply voltage Vcc dropping below the reference voltage VREF3, the charging circuit (CHG) 68 charges the capacitor 49 (illustrated in FIG. 1) through the terminal VCC, based on the voltage Vh at the terminal VH. Specifically, in response to the hysteresis comparator 67 outputting the low signal vccchg, the charging circuit 68 charges the capacitor 49, based on the voltage Vh, to thereby raise the power supply voltage Vcc. Meanwhile, the charging circuit 68 stops charging the capacitor 49, in response to the hysteresis comparator 67 outputting the high signal vccchg.

Accordingly, even if the AC-DC converter 10 operates in the "low voltage mode" and the power supply voltage Vcc is lower than the reference voltage VREF2, the control IC 42a can restrain the power supply voltage Vcc from becoming equal to or lower than the first predetermined voltage. This enables the control IC 42a to restrain the buffer 108 from stopping its operation. Note that the terminal VH corresponds to a "second terminal".

<<<Operation of Control IC 42a in Mode Transition>>>

===Transition from "Normal Mode" to "Low Voltage Mode"===

Figure 9:
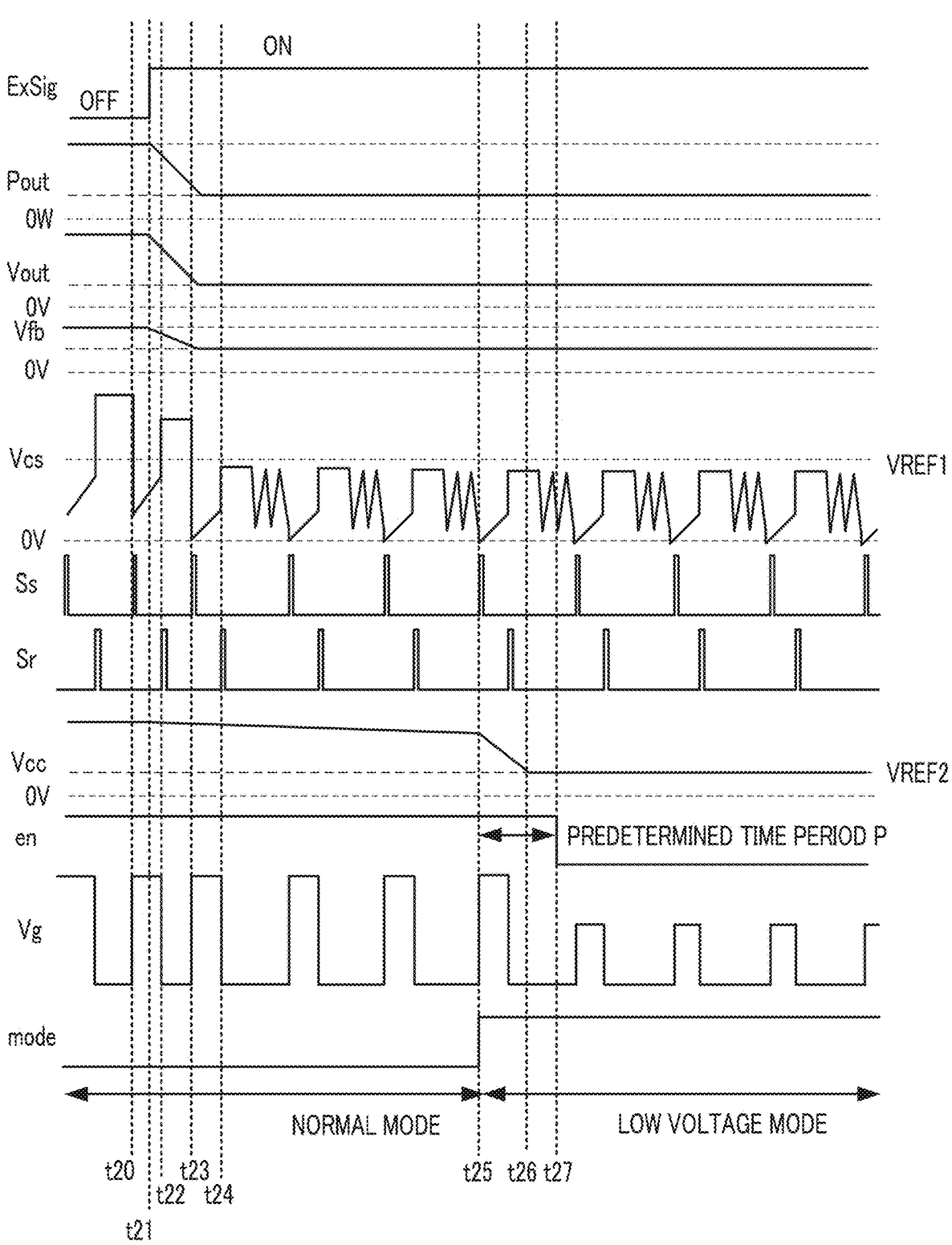

FIG. 9 is a diagram illustrating an example of the operation of the control IC 42a when transitioning from the "normal mode" to the "low voltage mode". It is assumed that the voltage Vfb does not drop below the reference voltage VREF0. For explanatory convenience, the period of the signal Sdrv is different from the period in actual operation. Further, it is assumed that the timer 62 outputs the high signal en at or before time t20.

At time t20, in response to the one shot circuit 102 outputting the pulse signal Ss, the OR circuit 105 outputs the high signal Sdrv. The buffer 108 turns on the power transistor 40 by the drive voltage Vg that has dropped from the power supply voltage Vcc.

At time 21, upon turning on of the switch 29 in response to the external signal ExSig, the AC-DC converter 10 starts to lower the output voltage Vout so as to reach the first target level (for example, 4 V).

At time 22 at which the voltage Vcs when the power transistor 40 is on becomes equal to the feedback voltage Vfb, the comparator 104 outputs the high signal Sr. Then, the SR flip-flop 103 outputs the low signal Vp1, and the OR circuit 105 outputs the low signal Sdrv. This turns off the power transistor 40.

Upon turning off of the power transistor 40, the voltage Vcs is charged from the auxiliary coil L3 through the diode 45 and the resistor 46. In this event, the output power Pout starts to drop, and the output voltage Vout also slightly drops from the second target level (for example, 32 V), however, since the output current Iout is large, the inductor current IL when the power transistor 40 is on is also large. Thus, the voltage Va of the auxiliary coil L3 is also large, and the voltage Vcs when the power transistor 40 is off is higher than the reference voltage VREF1.

In response to the one shot circuit 102 outputting the pulse signal Ss at time t23 at which the output voltage Vout reaches the first target level (for example, 4 V), the power transistor 40 is turned on, as at time t20.

In this event, since the voltage between the output voltage Vout and the voltage at the cathode of the Zener diode 27 rises upon turning on of the switch 29, the intensity of the light emitted by the light-emitting diode 28 increases. Accordingly, the phototransistor 48 passes a large sink current Ia, resulting in a drop in the voltage Vfb.

At time t24 at which the voltage Vcs when the power transistor 40 is turned on becomes equal to the voltage Vfb that has dropped, the power transistor 40 is turned off as at time t22. In this event, although the voltage Vcs is charged with the voltage Va from the auxiliary coil L3, the output power Pout has already dropped, and the output voltage Vout has also dropped, and thus the inductor current IL when the power transistor 40 is on decreases. Thus, the voltage Va at the auxiliary coil L3 also drops, and the voltage Vcs when the power transistor 40 is off is lower than the reference voltage VREF1.

At time t25 at which the voltage Vcs when the power transistor 40 is off has continued to be lower than the reference voltage VREF1 for a predetermined time period since time t24, the detection circuit 61 outputs the high signal mode. Note that the AC-DC converter 10 operates in the "normal mode" before time t25, and operates in the "low voltage mode" from time t25. Further, the discharge circuit 65 starts to discharge the capacitor 49.

At time t26, the discharge circuit 65 completes discharging the capacitor 49, and the power supply voltage Vcc drops to the reference voltage VREF2.

At time t27, at which the predetermined time period P has elapsed since time t25, the timer 62 outputs the low signal en, and the buffer 108 starts to drive the power transistor 40 by the drive voltage Vg of the power supply voltage Vcc.

Accordingly, when the switch 29 in FIG. 1 is turned on and the target level of the output voltage Vout is changed to the first target level, the control IC 42a drives the power transistor 40 by the drive voltage Vg of the power supply voltage Vcc that has dropped, thereby being able to suppress breakdown of the power transistor 40.

===Transition from "Low Voltage Mode" to "Normal Mode"===

Figure 10:
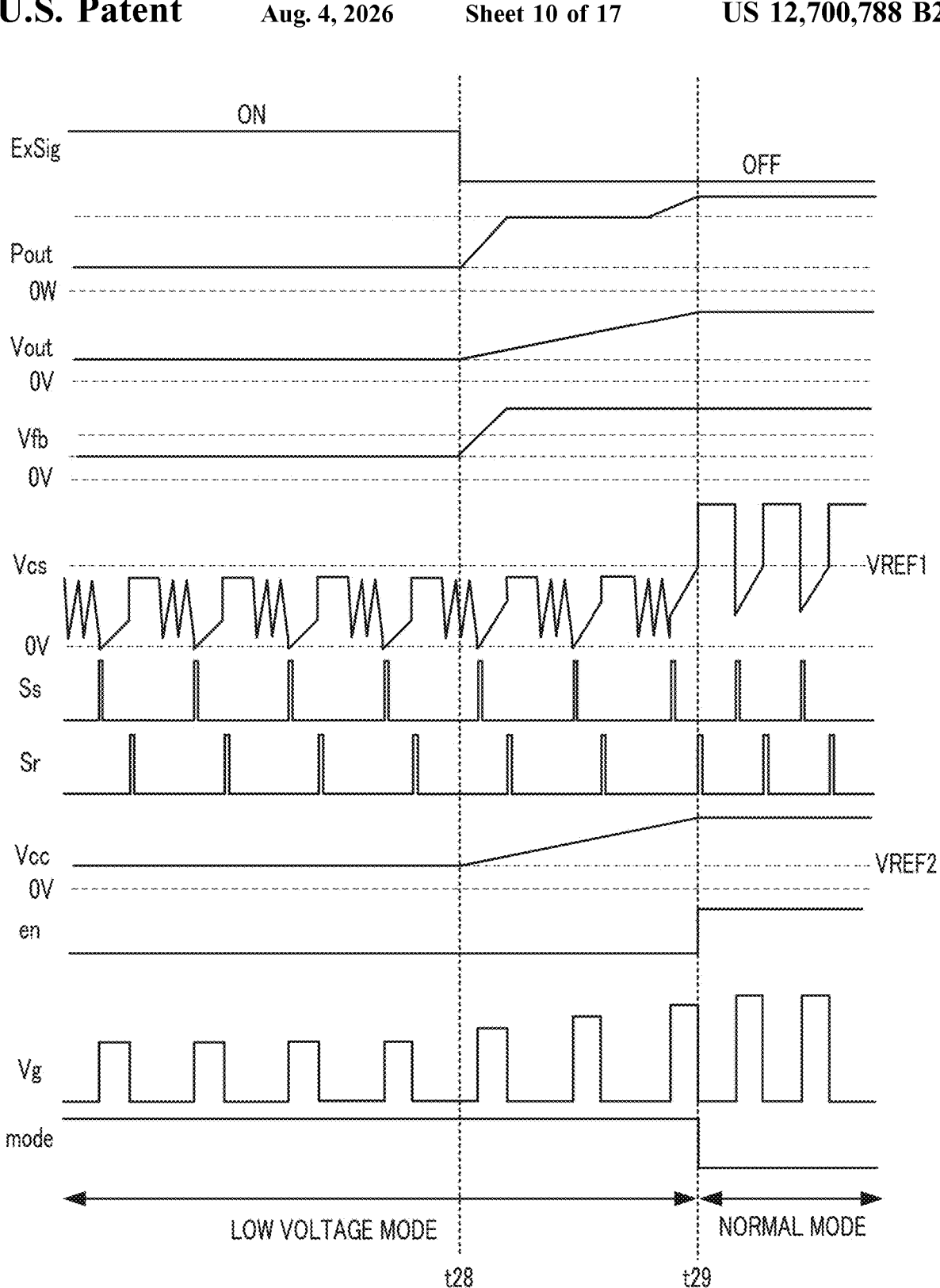

FIG. 10 is a diagram illustrating an example of the operation of the control IC 42a when transitioning from the "low voltage mode" to the "normal mode". It is assumed that the control IC 42a operates in the "low voltage mode" before time t28, and that the control IC 42a still operates in the "low voltage mode" from time t28 until time t29. It is also assumed that the voltage Vfb does not drop below the reference voltage VREF0. Further, as in FIG. 9, for explanatory convenience, the period of the signal Sdrv is different from the period in actual operation.

In response to the output current Iout increasing due to a sudden change in the load of the motor 30 and/or the like and the switch 29 being turned off at time t28, the current flowing through the light-emitting diode 28 decreases and the intensity of the light emitted by the light-emitting diode 28 decreases. Accordingly, the sink current Ia passed by the phototransistor 48 decreases, resulting in a rise in the voltage Vfb.

At time t29, in response to the voltage Vcs when the power transistor 40 is off exceeding the reference voltage VREF1, the detection circuit 61 outputs the low signal mode. From time t29, the AC-DC converter 10 operates in the "normal mode".

In response to the detection circuit 61 outputting the low signal mode, the timer 62 outputs the high signal en, and the buffer 108 starts to drive the power transistor 40 by the drive voltage Vg of a predetermined level lower than the power supply voltage Vcc.

This enables the control IC 42a to drive the power transistor 40 without breaking it, even if the AC-DC converter 10 operates in the "normal mode" and the power supply voltage Vcc rises

Modifications

Figure 11:
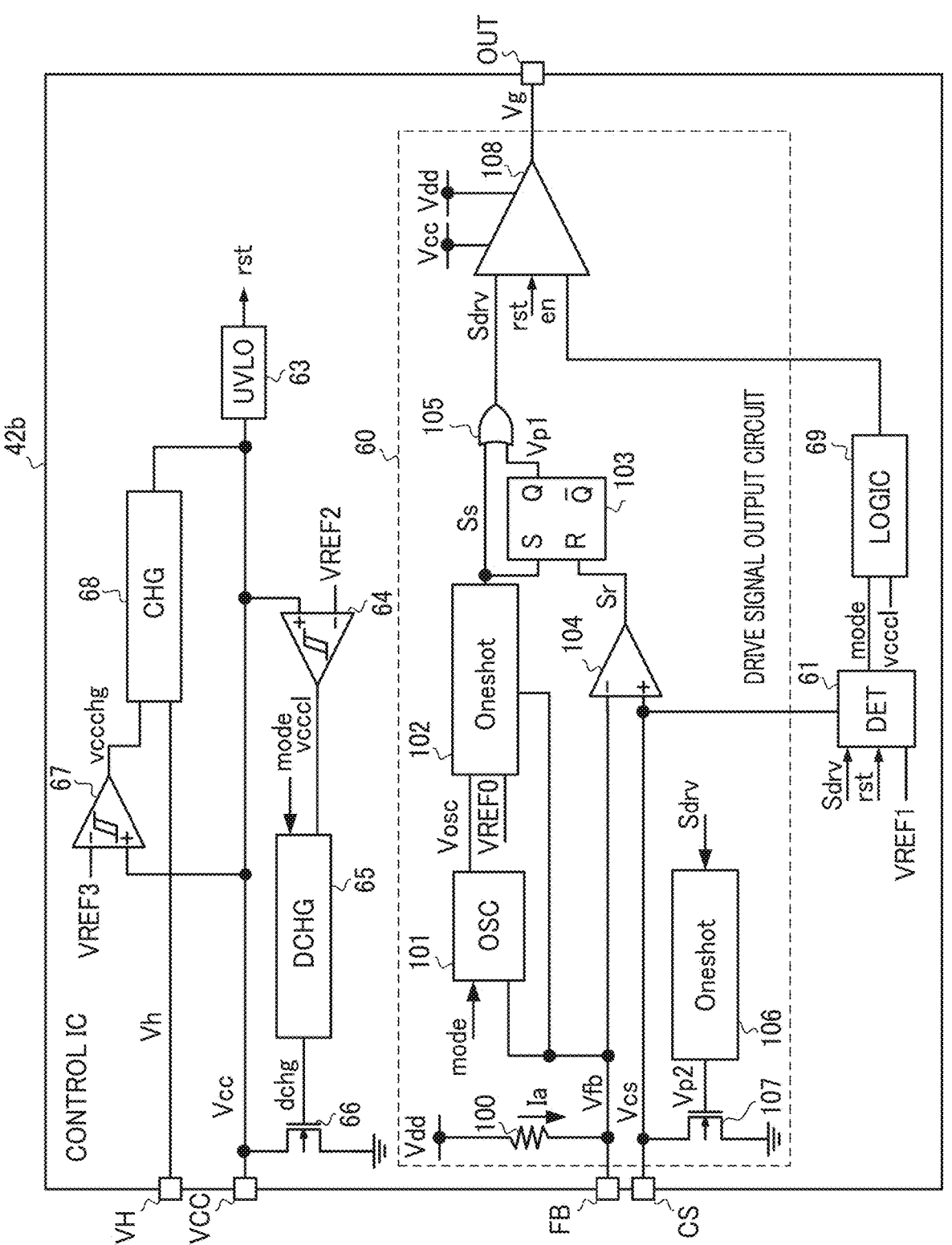
FIG. 11 is a diagram illustrating a configuration example of a control IC 42*b*.

FIG. 11 is a diagram illustrating a configuration example of the control IC 42b. The control IC 42b includes the drive signal output circuit 60, the detection circuit 61, the under voltage lock out 63, the hysteresis comparators 64 and 67, the discharge circuit 65, the NMOS transistor 66, the charging circuit 68, and a logic circuit 69.

<<Logic Circuit 69>>

The logic circuit (LOGIC) 69 outputs a signal en, instead of the timer 62 in FIG. 2. Specifically, in response to the detection circuit 61 detecting the "low voltage mode", and the power supply voltage Vcc dropping to the reference voltage VREF2, the logic circuit 69 outputs the low signal en. Meanwhile, when the detection circuit 61 detects the "normal mode" or when the power supply voltage Vcc is higher than the reference voltage VREF2, the logic circuit 69 outputs the high signal en.

<<<Operation of Control IC 42b in Mode Transition>>>

===Transition from "Normal Mode" to "Low Voltage Mode"===

Figure 12:
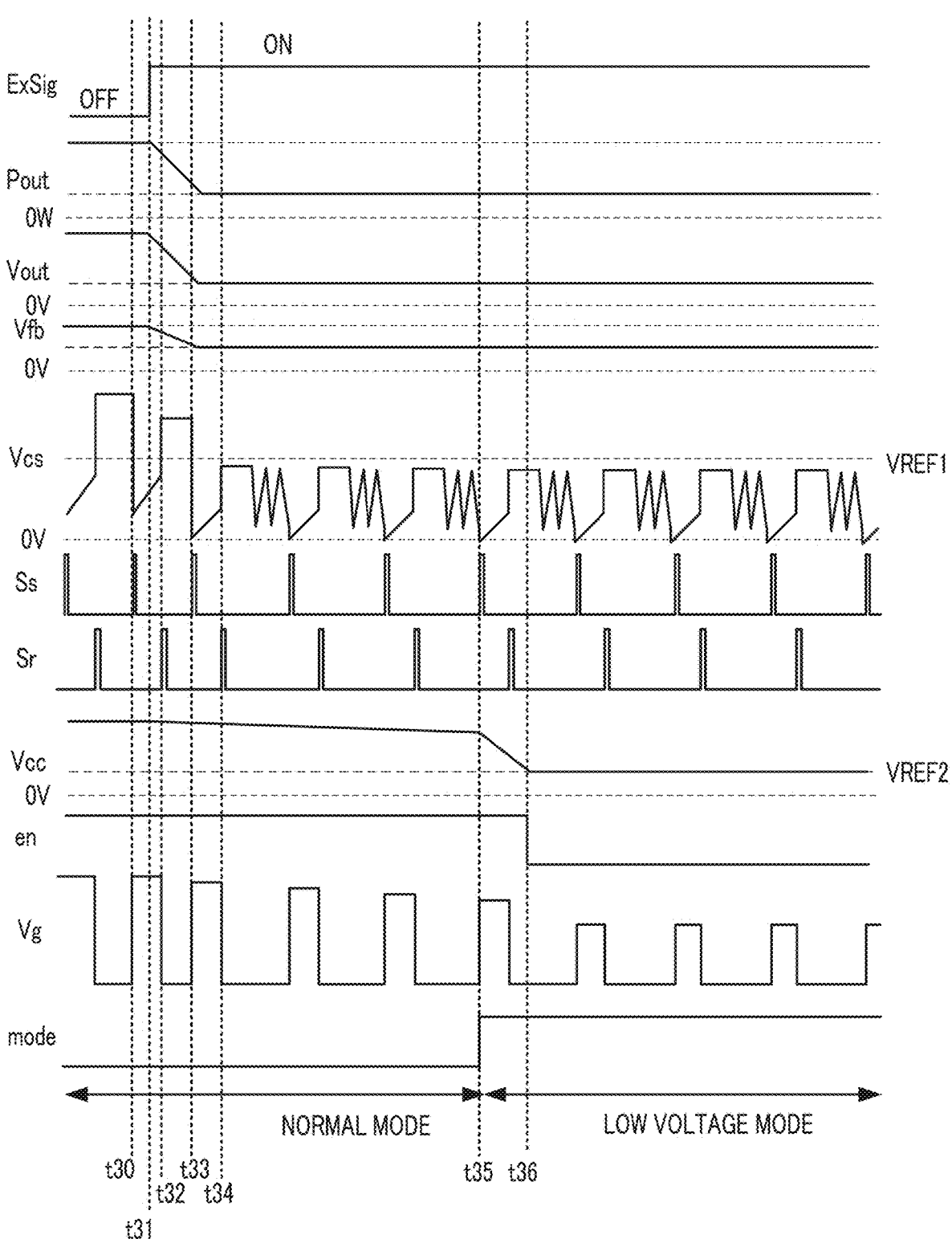
FIG. 12 is a diagram illustrating an example of an operation of a control IC 42*b*.

FIG. 12 is a diagram illustrating an example of the operation of the control IC 42b when transitioning from the "normal mode" to the "low voltage mode". Since the operation from time t30 to time t35 is the same as the operation from time t20 to time t25 in FIG. 9, a description thereof is omitted.

At time t36, in response to the discharge circuit 65 completing discharging the capacitor 49 and the power supply voltage Vcc dropping to the reference voltage VREF2, the logic circuit 69 outputs the low signal en, and the buffer 108 starts to drive the power transistor 40 by the drive voltage Vg of the power supply voltage Vcc.

Accordingly, in the control IC 42b, the logic circuit 69 outputs the low signal en, in response to the power supply voltage Vcc dropping to the reference voltage VREF2, when the switch 29 in FIG. 1 is turned on and the target level of the output voltage Vout is changed to the first target level.

Thus, the buffer 108 can drive the power transistor by the drive voltage Vg of the power supply voltage Vcc swiftly after the AC-DC converter 10 starts to operate in the "low voltage mode". This further reduces the power consumption of the control IC 42b when the AC-DC converter 10 operates in the "low voltage mode".

===Transition from "Low Voltage Mode" to "Normal Mode"===

Figure 13:
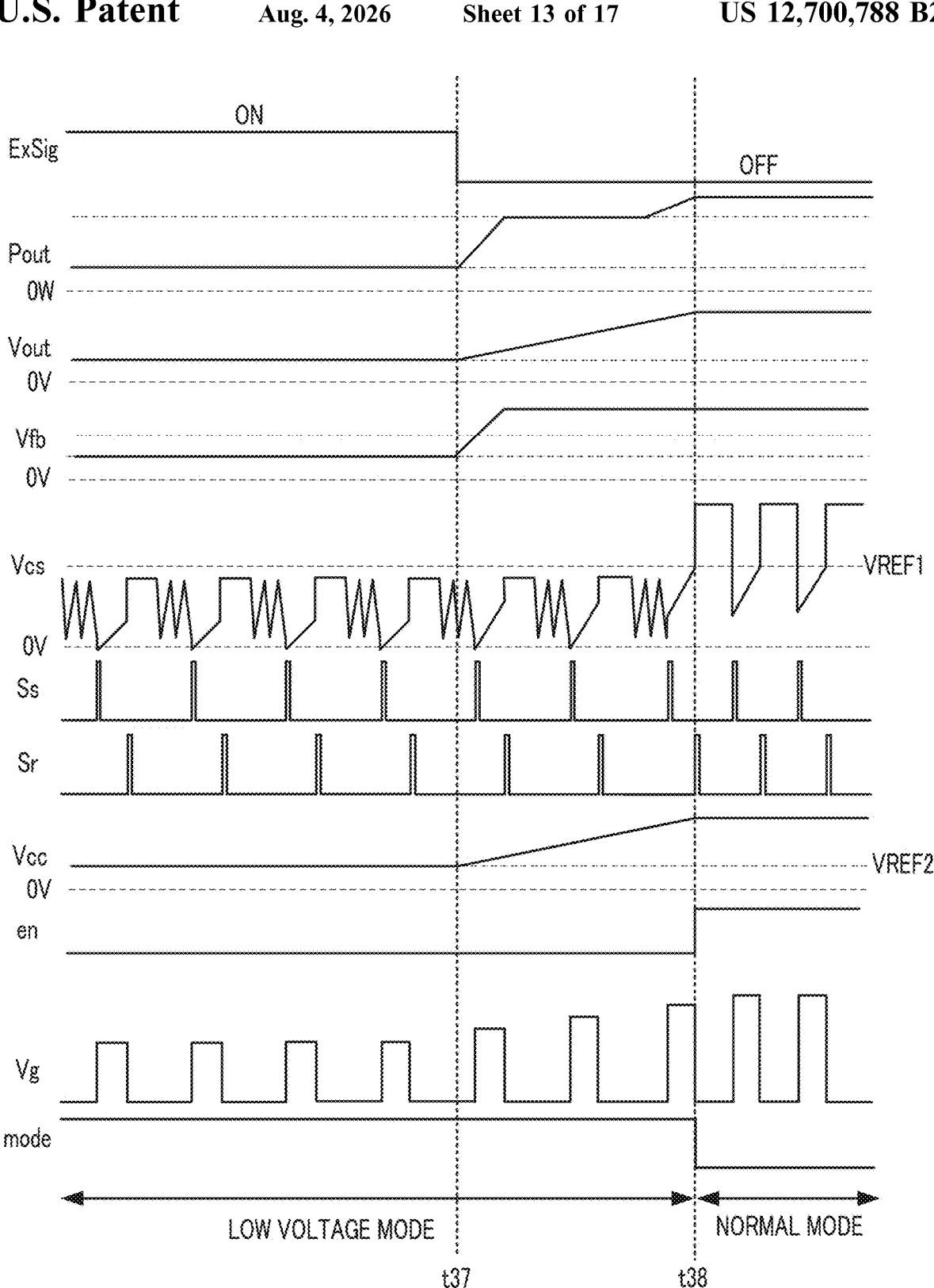
FIG. 13 is a diagram illustrating an example of an operation of a control IC 42*b*.

FIG. 13 is a diagram illustrating an example of the operation of the control IC 42*b* when transitioning from the "low voltage mode" to the "normal mode". Since the operation of the control IC 42*b* from time t37 to time t38 is the same as the operation from time t28 to time t29 in FIG. 10, a description thereof is omitted.

This enables the control IC 42*b*, as with the control IC 42*a*, to drive the power transistor 40 without breaking it, even if the AC-DC converter 10 operates in the "normal mode" and the power supply voltage Vcc rises.

Figure 14:
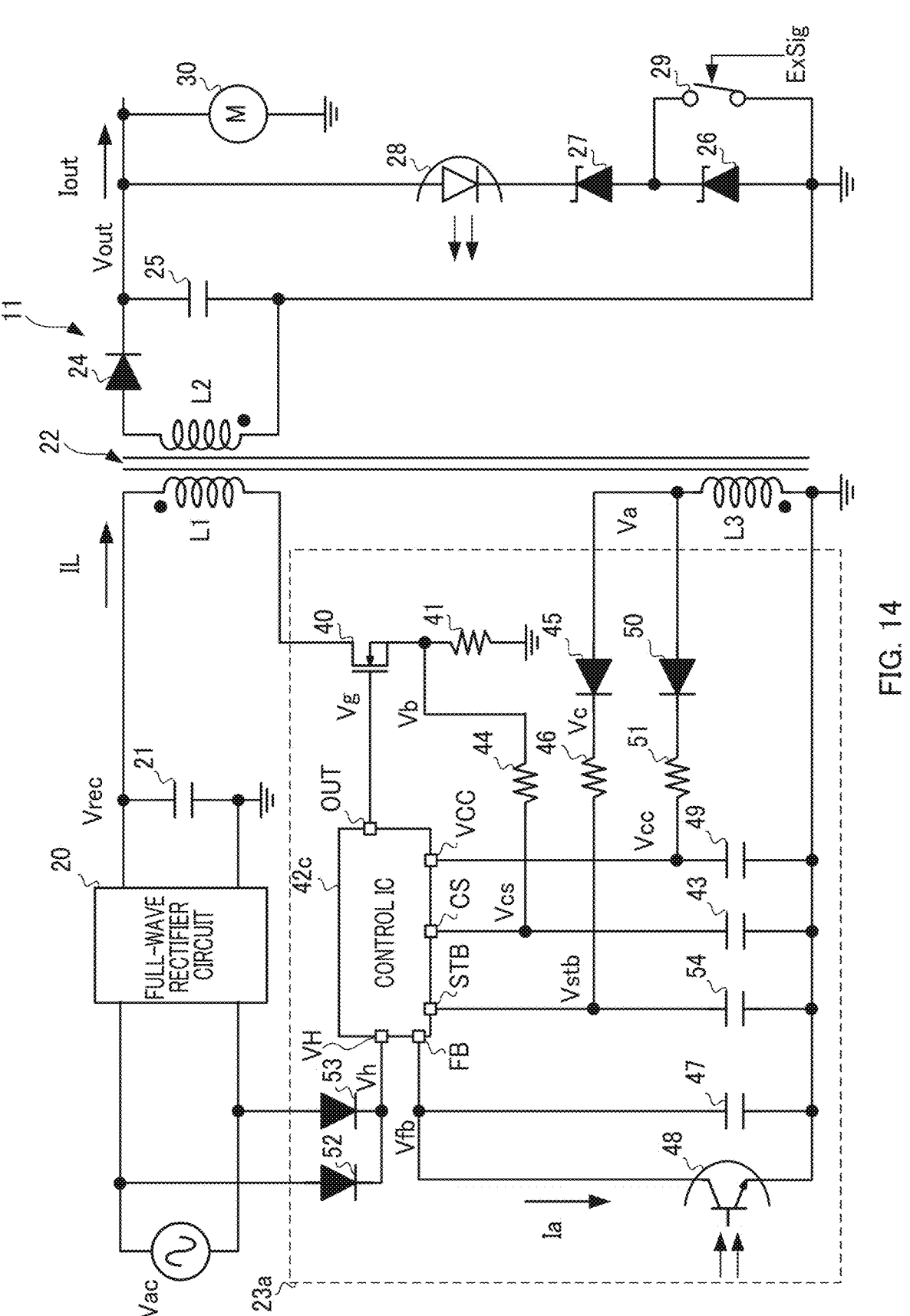
FIG. 14 is a diagram illustrating a configuration example of an AC-DC converter 11.

FIG. 14 is a diagram illustrating a configuration example of an AC-DC converter 11. The AC-DC converter 11 is a flyback power supply circuit that generates the output voltage Vout at a target level from the AC voltage Vac of a commercial power supply, as with the AC-DC converter 10.

<<<Overview of AC-DC Converter 11>>>

The AC-DC converter 11 includes the full-wave rectifier circuit 20, the capacitors 21 and 25, the transformer 22, a control block 23*a*, the diode 24, the Zener diodes 26 and 27, the light-emitting diode 28, and the switch 29. The AC-DC converter 11 supplies power to the motor 30.

<<<Overview of Control Block 23*a*>>>

The control block 23*a* is a circuit block that controls the AC-DC converter 11. The control block 23*a* includes the power transistor 40, the resistors 41, 44, 46, and 51, a control IC 42*c*, the capacitors 43, 47, and 49, and a capacitor 54, the diodes 45, 50, 52, and 53, and the phototransistor 48.

The control IC 42*c* is an integrated circuit that controls switching of the power transistor 40 such that the output voltage Vout reaches a target level. Specifically, the control IC 42*c* drives the power transistor 40, based on the inductor current IL and the output voltage Vout.

Note that the control IC 42*c* has the terminals CS, FB, OUT, VCC, and VH, and a terminal STB, and details of the control IC 42*c* will be described later. Note that the gate electrode of the power transistor 40 is connected to the terminal OUT. Although the actual control IC 42*c* also has other terminals, they are omitted for convenience of explanation.

The capacitor 54 is provided between the terminal STB and the ground. Note that the terminal STB corresponds to a "fourth terminal" and the capacitor 54 corresponds to a "third capacitor".

The diode 45 has an anode connected to the auxiliary coil L3, and a cathode connected to the terminal STB through the resistor 46. Note that a voltage corresponding to the voltage Va at the auxiliary coil L3, that is, the voltage at the capacitor 54 is applied to the terminal STB.

Figure 15:
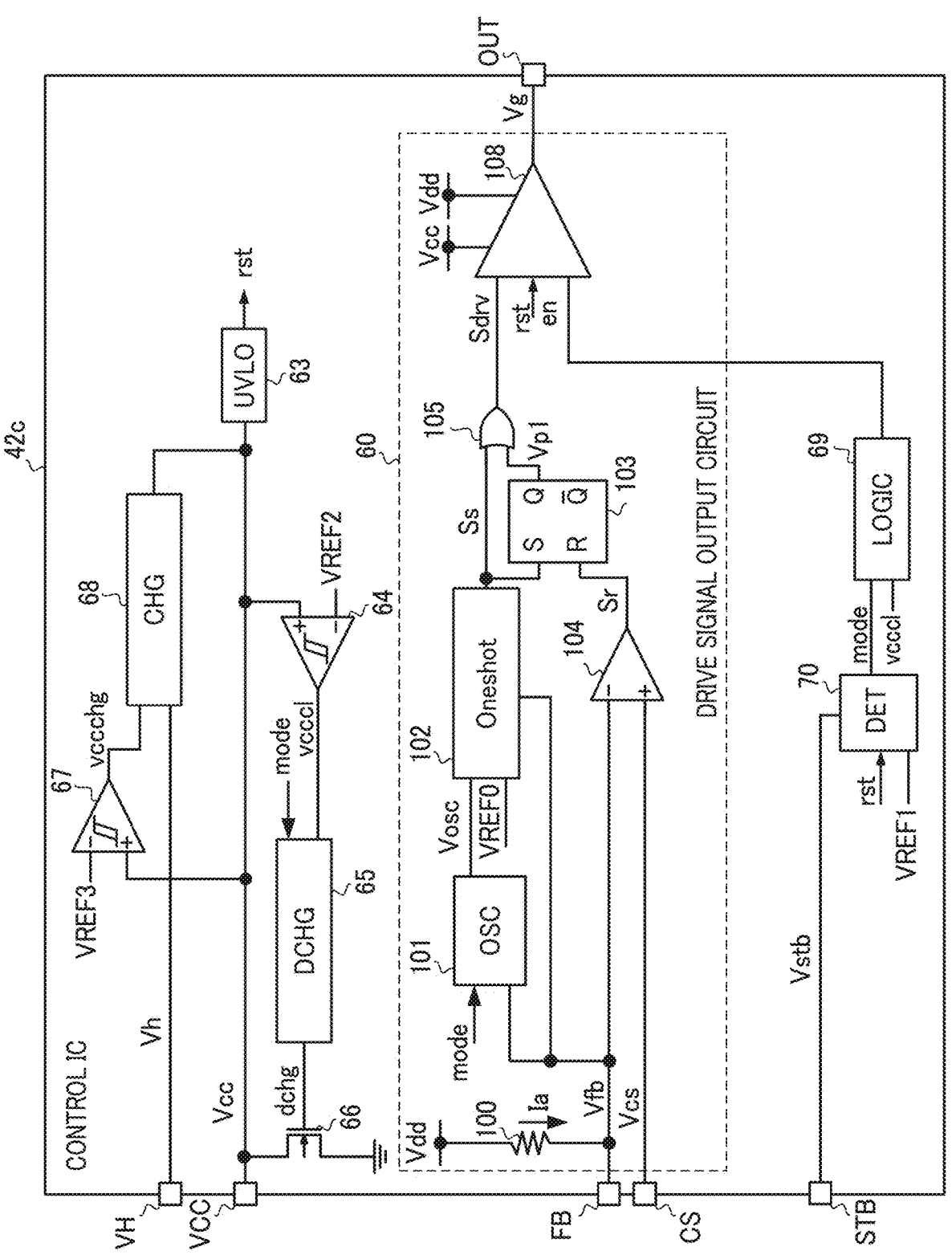
FIG. 15 is a diagram illustrating a configuration example of a control IC 42*c*.

FIG. 15 is a diagram illustrating a configuration example of the control IC 42*c*. The control IC 42*c* includes the drive signal output circuit 60, the under voltage lock out 63, the hysteresis comparators 64 and 67, the discharge circuit 65, the NMOS transistor 66, the charging circuit 68, the logic circuit 69, and a detection circuit 70.

<<Detection Circuit 70>>

The detection circuit (DET) 70 detects that the target level of the output voltage Vout has changed, with the external signal ExSig. Specifically, the detection circuit 70 outputs the high signal mode, in response to the time period during which a voltage Vstb at the capacitor 54 is lower than the reference voltage VREF1 having continued for a predetermined time since turning on of the switch 29 in FIG. 14. Note that in this case, the detection circuit 70 detects that the operation mode of the AC-DC converter 11 is the "low voltage mode".

Meanwhile, in response to the switch 29 being turned off and the voltage Vstb exceeding the reference voltage VREF1, the detection circuit 70 outputs the low signal mode. In this case, the detection circuit 70 detects that the operation mode of the AC-DC converter 11 is the "normal mode". Further, in response to the under voltage lock out 63 outputting the high reset signal rst, the detection circuit 70 outputs the low signal mode.

Accordingly, upon turning on of the switch 29, the control IC 42*c* drives the power transistor 40 such that the output voltage Vout that has dropped to the first target level is maintained. In association therewith, the coil voltage at the auxiliary coil L3 in FIG. 14 drops, and thus the control IC 42*c* on the primary side of the transformer 22 can detect that the target level of the output voltage Vout has dropped, by detecting the voltage Vstb. Note that the detection circuit 70 corresponds to the "mode detection circuit".

<<<Operation of Control IC 42*c* in Mode Transition>>>

===Transition from "normal mode" to "low voltage mode"===

Figure 16:
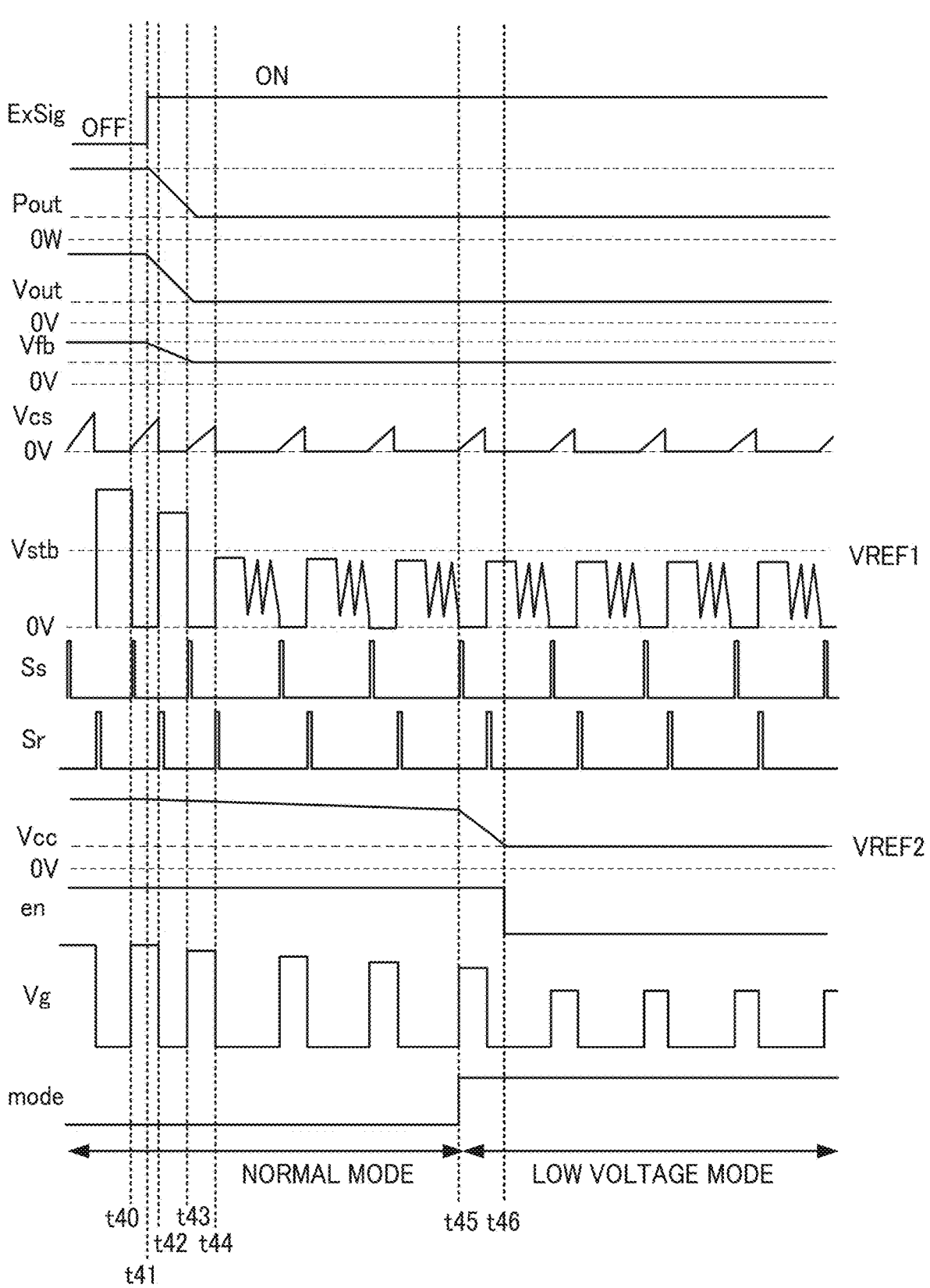
FIG. 16 is a diagram illustrating an example of an operation of a control IC 42*c*.

FIG. 16 is a diagram illustrating an example of the operation of the control IC 42*c* when transitioning from the "normal mode" to the "low voltage mode". Note that it is assumed that the voltage Vfb does not drop below the reference voltage VREF0. Further, for convenience of explanation, the period of the signal Sdrv is different from the period in actual operation.

In response to the one shot circuit 102 outputting the pulse signal Ss at time t40, the OR circuit 105 outputs the high signal Sdrv. The buffer 108 turns on the power transistor 40 by the drive voltage Vg that has dropped from the power supply voltage Vcc.

At time t41, when the switch 29 is turned on in response to the external signal ExSig, the AC-DC converter 11 starts to lower the output voltage Vout so as to reach a first target level (for example, 4 V).

At time t42, at which the voltage Vcs becomes equal to the voltage Vfb, the comparator 104 outputs the high signal Sr. Then, the SR flip-flop 103 outputs the low signal Vp1, and the OR circuit 105 outputs the low signal Sdrv. This turns off the power transistor 40.

Upon turning off of the power transistor 40, the capacitor 54 is charged from the auxiliary coil L3 through the diode 45 and the resistor 46. In this event, the output power Pout starts to drop, and the output voltage Vout also slightly drops from the second target level (for example, 32 V), however, since the output current Iout is large, the inductor current IL when the power transistor 40 is on is also large. Accordingly, the voltage Va at the auxiliary coil L3 is also large, and the voltage Vstb when the power transistor 40 is off is higher than the reference voltage VREF1.

At time t43, at which the output voltage Vout reaches the first target level (for example, 4 V), in response to the one-shot circuit 102 outputting the pulse signal Ss, power transistor 40 is turned on, as at time t40.

In this event, since the voltage between the output voltage Vout and the voltage at the cathode of the Zener diode 27 rises upon turning on of the switch 29, the intensity of the light emitted by the light-emitting diode 28 increases. Accordingly, the sink current Ia passed by the phototransistor 48 increases, resulting in a drop in the voltage Vfb.

At time t44, at which the voltage Vcs becomes equal to the voltage Vfb that has dropped, the power transistor 40 is turned off, as at time t42. In this event, the voltage Vstb is charged with the voltage Va from the auxiliary coil L3. However, because the output power Pout has already dropped and the output voltage Vout has also dropped, the inductor current IL when the power transistor 40 is on decreases. Thus, the voltage Va at the auxiliary coil L3 also drops, and the voltage Vstb is lower than the reference voltage VREF1.

At time t45, at which the time period during which the voltage Vstb is lower than the reference voltage VREF1 has continued for a predetermined time period since time t44, the detection circuit 70 outputs the high signal mode. Note that the AC-DC converter 11 operates in the "normal mode" before time t45, and operates in the "low voltage mode" from time t45. Further, the discharge circuit 65 starts to discharge the capacitor 49.

At time t46, in response to the discharge circuit 65 completing discharging the capacitor 49 and the power supply voltage Vcc dropping to the reference voltage VREF2, the logic circuit 69 outputs the low signal en, and the buffer 108 starts to drive the power transistor 40 by the drive voltage Vg of the power supply voltage Vcc.

Accordingly, in the control IC 42c, the logic circuit 69 outputs the low signal en, in response to the power supply voltage Vcc dropping to the reference voltage VREF2, when the switch 29 in FIG. 14 is turned on and the target level of the output voltage Vout is changed to the first target level.

Thus, the buffer 108 can drive the power transistor by the drive voltage Vg of the power supply voltage Vcc swiftly after the AC-DC converter 11 starts to operate in the "low voltage mode". This further reduces the power consumption of the control IC 42c when the AC-DC converter 11 operates in the "low voltage mode".

===Transition from "Low Voltage Mode" to "Normal Mode"===

Figure 17:
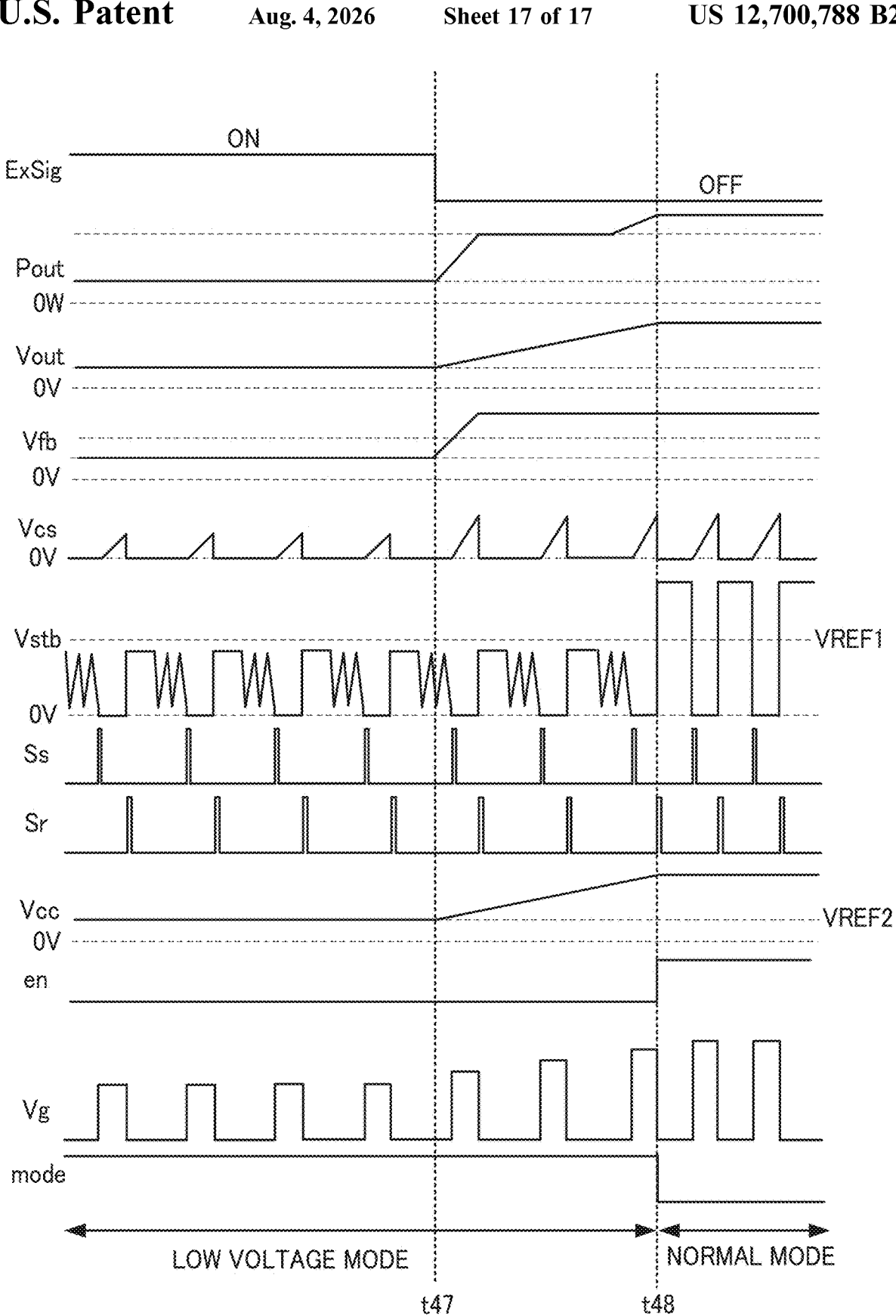
FIG. 17 is a diagram illustrating an example of an operation of a control IC 42*c*.

FIG. 17 is a diagram illustrating an example of the operation of the control IC 42c when transitioning from the "low voltage mode" to the "normal mode". It is assumed that the control IC 42c operates in the "low voltage mode" before time t47, and that the control IC 42c still operates in the "low voltage mode" from time t47 until time t48. It is also assumed that the voltage Vfb does not drop below the reference voltage VREF0. For explanatory convenience, the period of the signal Sdrv is different from the period in actual operation.

At time t47, in response to the output current Iout increasing due to a sudden change in the load of the motor 30 and/or the like and the switch being turned off, the current flowing through the light-emitting diode 28 decreases, and the intensity of the light emitted by the light-emitting diode 28 decreases. Accordingly, the sink current Ia passed by the phototransistor 48 decreases, resulting in a rise in the voltage Vfb.

At time t48, in response to the voltage Vcs when the power transistor 40 is off exceeding the reference voltage VREF1, the detection circuit 70 outputs the low signal mode. From t48, the AC-DC converter 11 operates in the "normal mode".

In response to the detection circuit 70 outputting the low signal mode, the logic circuit 69 outputs the high signal en, and the buffer 108 starts to drive the power transistor 40 by the drive voltage Vg of a predetermined level lower than the power supply voltage Vcc.

Accordingly, the control IC 42c, as with the control IC 42b, can drive the power transistor 40 without breaking it, even if the AC-DC converter 11 operates in the "normal mode" and the power supply voltage Vcc rises.

Summary

A description has been given of the AC-DC converter 10 according to an embodiment of the present disclosure. The control IC 42a includes the terminal VCC, the detection circuit 61, the discharge circuit 65, and the drive signal output circuit 60. When the AC-DC converter 10 operates in the "low voltage mode", the power supply voltage Vcc is lowered and the power transistor 40 is driven by the power supply voltage Vcc having dropped. This makes it possible to provide an integrated circuit capable of suppressing breakdown of a transistor when a change to lower an output voltage is performed.

Further, the drive signal output circuit 60 includes the driver circuit 201 and the limiter circuit 202. The control IC 42a drives the power transistor 40 using only the driver circuit 201, when the AC-DC converter 10 operates in the "low voltage mode". This enables the control IC 42a to operate with low power consumption.

In addition, the control IC 42a further includes the timer 62, wherein the limiter circuit 202 drives the power transistor 40 at a predetermined level lower than the power supply voltage Vcc, until the predetermined time period P has elapsed since it is detected that the operation mode is the "low voltage mode". Accordingly, setting the predetermined time period P so as to be longer than the time period during which the discharge circuit 65 discharges the capacitor 49 suppresses the breakdown of the power transistor 40 when the operation of the buffer 108 is changed.

In addition, the control IC 42a further includes the under voltage lock out 63, wherein the drive signal output circuit 60 stops operating when the power supply voltage Vcc drops below the first predetermined voltage. Accordingly, the control IC 42a drives the power transistor 40 only when the power supply voltage Vcc is higher than the first predetermined voltage.

In addition, the control IC 42a continues to drive the power transistor 40 such that the power supply voltage Vcc exceeds the first predetermined voltage. This enables the control IC 42a to restrain the power transistor 40 from being stopped.

In addition, the control IC 42a further includes the terminal VH, the hysteresis comparator 67, and the charging circuit 68. Accordingly, even if the power transistor 40 is not driven and the power supply voltage Vcc drops, the control IC 42a can maintain the power supply voltage Vcc higher than the first predetermined voltage, thereby being able to restrain the power transistor 40 from being unable to be driven.

In addition, the control IC 42a further includes the terminal CS, wherein the detection circuit 61 detects whether the operation mode of the AC-DC converter 10 is the "low voltage mode" or the "normal mode", based on the voltage Vcs at the terminal CS. In addition, the capacitance value of the capacitor 43 connected to the terminal CS is smaller than the capacitance value of the capacitor 49 in FIG. 1 connected to the terminal VCC. Thus, the use of the voltage Vcs at the terminal CS facilitates detecting of a change in the coil voltage of the auxiliary coil L3 in FIG. 1. This enables the control IC 42a to easily detect the operation mode of the AC-DC converter 10.

In addition, the control IC 42b further includes the hysteresis comparator 64, wherein the limiter circuit 202 drives the power transistor 40 at the predetermined level having dropped from the power supply voltage Vcc until the power supply voltage Vcc drops to the reference voltage VREF2 after it is detected that the operation mode is the "low voltage mode". Accordingly, the control IC 42b further reduces the power consumption when the AC-DC converter 10 operates in the "low voltage mode".

In addition, the control IC 42*c* further includes the terminal STB, wherein the detection circuit 70 detects whether the operation mode of the AC-DC converter 11 is the "low voltage mode" or the "normal mode", based on the voltage Vstb at the terminal STB. Further, the capacitance value of the capacitor 54 connected to the terminal STB is smaller than the capacitance value of the capacitor 49 in FIG. 14 connected to the terminal VCC. Thus, the use of the voltage Vstb at the terminal STB facilitates detecting of a change in the coil voltage of the auxiliary coil L3 in in FIG. 14. This enables the control IC 42*c* to easily detect the operation mode of the AC-DC converter 11.

According to the present disclosure, it is possible to provide an integrated circuit capable of suppressing breakdown of a transistor when a change to lower an output voltage is performed.

The present disclosure is directed to provision of an integrated circuit capable of suppressing breakdown of a transistor when a change to lower an output voltage is performed.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that includes a transformer including a primary coil, a secondary coil, and an auxiliary coil, a transistor configured to control a current flowing through the primary coil, and a first capacitor configured to receive a power supply voltage corresponding to a coil voltage at the auxiliary coil, the power supply circuit being configured to operate in an operation mode to generate an output voltage from an alternating current (AC) voltage, the operation mode being either a first mode, in which the generated output voltage is at a first target level, or a second mode, in which the generated output voltage is at a second target level higher than the first target level, the integrated circuit being configured to drive the transistor, the integrated circuit comprising: a first terminal connected to the first capacitor, the first terminal being configured to receive the power supply voltage corresponding to the coil voltage at the auxiliary coil; a mode detection circuit configured to detect whether the operation mode of the power supply circuit is the first mode or the second mode; a discharge circuit configured to discharge the first capacitor and lower a level of the power supply voltage to a first level, when it is detected that the operation mode is the first mode; and a drive signal output circuit configured to output a drive signal to the transistor, the drive signal being at a level of the power supply voltage, when the operation mode is detected to be the first mode, and at a predetermined level lower than the level of the power supply voltage, when the operation mode is detected to be the second mode.

2. The integrated circuit according to claim 1, wherein the drive signal output circuit includes
   a driver circuit configured to output the drive signal, based on the power supply voltage, and
   a limiter circuit configured to limit a level of the drive signal to the predetermined level, when the operation mode is detected to be the second mode.

3. The integrated circuit according to claim 2, further comprising:

a timer configured to measure a predetermined time period, when the operation mode is detected to be the first mode, wherein
the limiter circuit limits the level of the drive signal to the predetermined level, until the predetermined time period has elapsed since the operation mode is detected to be the first mode.

4. The integrated circuit according to claim 2, further comprising:
a second detection circuit configured to detect whether the level of the power supply voltage has dropped to the first level, wherein
the limiter circuit limits the level of the drive signal to the predetermined level, until the level of the power supply voltage drops to the first level after the operating mode is detected to be the first mode.

5. The integrated circuit according to claim 1, further comprising:
a determination circuit configured to determine whether the level of the power supply voltage has dropped below a second level lower than the first level, wherein
the drive signal output circuit stops operating, in response to the power supply voltage dropping below the second level.

6. The integrated circuit according to claim 5, wherein the drive signal output circuit outputs the drive signal to the transistor such that the level of the power supply voltage exceeds the second level.

7. The integrated circuit according to claim 5, further comprising:
a second terminal configured to receive a voltage corresponding to the AC voltage;
a first detection circuit configured to detect whether the level of the power supply voltage is below a third level higher than the second level; and
a charging circuit configured to charge the first capacitor, based on the voltage received at the second terminal, so as to, in response to the power supply voltage becoming below the third level, increase the level of the power supply voltage to exceed the third level.

8. The integrated circuit according to claim 1, wherein
the power supply circuit further includes a second capacitor, and
the integrated circuit further includes a third terminal to which the second capacitor is connected, and
the third terminal is configured to
   receive a voltage corresponding to a current flowing through the transistor, when the transistor is on, and
   receive a voltage corresponding to the coil voltage, when the transistor is off, wherein
the mode detection circuit detects whether the operation mode of the power supply circuit is the first mode or the second mode, based on the voltage received at the third terminal when the transistor is off.

9. The integrated circuit according to claim 1, wherein
the power supply circuit further includes a third capacitor, and
the integrated circuit further includes a fourth terminal to which the third capacitor is connected, the fourth terminal being configured to receive a voltage corresponding to the coil voltage, wherein
the mode detection circuit detects whether the operation mode of the power supply circuit is the first mode or the second mode, based on the voltage received at the fourth terminal.

10. A power supply circuit configured to operate in an operation mode to generate an output voltage from an alternating current (AC) voltage, the operation mode being either a first mode, in which the generated output voltage is at a first target level, or a second mode, in which the generated output voltage is at a second target level higher than the first target level, the power supply circuit comprising: a transformer including a primary coil, a secondary coil, and an auxiliary coil; a transistor configured to control a current flowing through the primary coil; a first capacitor configured to receive a power supply voltage corresponding to a coil voltage at the auxiliary coil; and an integrated circuit configured to drive the transistor, the integrated circuit including a first terminal connected to the first capacitor, the first terminal being configured to receive the power supply voltage corresponding to the coil voltage at the auxiliary coil, a mode detection circuit configured to detect whether the operation mode of the power supply circuit is the first mode or the second mode, a discharge circuit configured to discharge the first capacitor and lower a level of the power supply voltage to a first level, upon detecting that the operation mode is the first mode, and a drive signal output circuit configured to output a drive signal to the transistor, the drive signal being at the level of the power supply voltage, when the operation mode is detected to be the first mode, and at a predetermined level lower than the level of the power supply voltage, when the operation mode is detected to be the second mode.

* * * * *